United States Patent
Zhang et al.

(10) Patent No.: US 11,711,712 B2
(45) Date of Patent: Jul. 25, 2023

(54) MEASURING METHOD FOR REALIZING CSI OF DOWNLINK CHANNEL WITH REDUCED TERMINAL POWER CONSUMPTION, BASE STATION, AND TERMINAL

(71) Applicant: GUANGDONG OPPO MOBILE TELECOMMUNICATIONS CORP., LTD., Guangdong (CN)

(72) Inventors: Zhi Zhang, Guangdong (CN); Hua Xu, Ottawa (CA); Ning Yang, Guangdong (CN)

(73) Assignee: GUANGDONG OPPO MOBILE TELECOMMUNICATION'S CORP., LTD., Guangdong (CN)

( * ) Notice: Subject to any disclaimer, the term of this patent is extended or adjusted under 35 U.S.C. 154(b) by 40 days.

(21) Appl. No.: 17/244,546

(22) Filed: Apr. 29, 2021

(65) Prior Publication Data
US 2021/0250799 A1    Aug. 12, 2021

Related U.S. Application Data

(63) Continuation of application No. 16/476,195, filed as application No. PCT/CN2017/083076 on May 4, 2017, now Pat. No. 11,026,113.

(30) Foreign Application Priority Data

Jan. 6, 2017    (WO) ................ PCT/CN2017/070485

(51) Int. Cl.
*H04W 24/10* (2009.01)
*H04W 4/80* (2018.01)
(Continued)

(52) U.S. Cl.
CPC ........... *H04W 24/10* (2013.01); *H04L 1/0026* (2013.01); *H04W 4/80* (2018.02); *H04W 72/23* (2023.01)

(58) Field of Classification Search
CPC .... H04L 1/0026; H04L 5/0048; H04W 24/10; H04W 4/80; H04W 72/042;
(Continued)

(56) References Cited

U.S. PATENT DOCUMENTS

| 11,026,113 B2 * | 6/2021 | Zhang ................... H04W 24/10 |
| 2013/0258897 A1 * | 10/2013 | Park ...................... H04W 24/10 370/252 |

(Continued)

FOREIGN PATENT DOCUMENTS

| CN | 182237958 A | 11/2011 |
| CN | 102612056 A | 7/2012 |

(Continued)

OTHER PUBLICATIONS

Panasonic, "CSi report/measurement in MTC", 3GPP TSG RAN WG1 Meeting #82 R1-153971, Beijing, China, Aug. 24-28, 2015.
(Continued)

*Primary Examiner* — Benjamin H Elliott, IV
(74) *Attorney, Agent, or Firm* — Ladas & Parry LLP

(57) ABSTRACT

Disclosed are a measuring method, a base station, and a terminal. The method comprises: a base station transmits to a terminal a switching message of a narrow bandwidth receiving mode, thus instructing the terminal to switch to a specified narrow bandwidth to receive information; when channel state information (CSI) of a downlink channel needs to be measured, the base station schedules the terminal to switch sequentially to at least two different measuring narrow bandwidths to measure a downlink reference signal, where the width of the narrow bandwidth and that of the at
(Continued)

least two different measuring narrow bandwidths are less than the width of a system bandwidth. The employment of embodiments of the present invention allows the terminal to flexibly switch between the narrow bandwidth and the system bandwidth, reduces power consumption of the terminal, and implements the measurement of the CSI of the downlink channel at the same time.

16 Claims, 15 Drawing Sheets

(51) Int. Cl.
  *H04L 1/00* (2006.01)
  *H04W 72/23* (2023.01)
(58) Field of Classification Search
  CPC ............... H04W 72/0473; H04W 72/04; H04B 7/0632; Y02D 70/21; Y02D 70/1262
  See application file for complete search history.

(56) References Cited

U.S. PATENT DOCUMENTS

| | | | |
|---|---|---|---|
| 2013/0322363 A1* | 12/2013 | Chen ............... | H04W 72/042 370/329 |
| 2016/0127936 A1* | 5/2016 | Chatterjee ........... | H04W 4/70 370/252 |
| 2016/0302092 A1* | 10/2016 | Sartori ............... | H04L 5/0064 |
| 2016/0323901 A1* | 11/2016 | Yum .................. | H04B 7/0632 |
| 2018/0014219 A1* | 1/2018 | Takeda ............... | H04W 24/10 |
| 2018/0019855 A1* | 1/2018 | Zhang ............... | H04B 7/0626 |
| 2018/0069612 A1* | 3/2018 | Yum .................. | H04L 5/0091 |
| 2018/0287870 A1* | 10/2018 | Yerramalli ........... | H04W 72/04 |
| 2019/0007923 A1* | 1/2019 | Blankenship ......... | H04L 5/0073 |
| 2019/0357070 A1* | 11/2019 | Zhang ............... | H04W 72/042 |
| 2019/0357234 A1* | 11/2019 | Yang ................. | H04L 5/0094 |
| 2021/0243828 A1* | 8/2021 | Kim .................. | H04W 4/70 |
| 2021/0250799 A1* | 8/2021 | Zhang ............... | H04W 72/04 |

FOREIGN PATENT DOCUMENTS

| | | |
|---|---|---|
| CN | 102958133 A | 3/2013 |
| CN | 103067945 A | 4/2013 |
| CN | 103368699 A | 10/2013 |
| CN | 104380820 A | 2/2015 |
| CN | 105991220 A | 10/2016 |
| EP | 2595425 A1 | 5/2013 |
| KR | 20100059931 A | 6/2010 |
| RU | 2446335 C2 | 3/2012 |
| RU | 2537375 C2 | 1/2015 |
| WO | 2010128744 A1 | 11/2010 |
| WO | 2016121877 A1 | 8/2016 |
| WO | 2016183819 A1 | 10/2016 |

OTHER PUBLICATIONS

ZTE, "Considerations on CSI feedback for MTC enhancement", 3GPP TSG RAN WG1 Meeting #82 R1-154046, Beijing, China, Aug. 24-28, 2015.
Sony, CSI Measurement for LC-MTC®, 3GPP TSG-RAN WG1 Meeting #82 R1-154215, Beijing, PR China, Aug. 24-28, 2015.
Spreadtrum Communications, "Aspects of CSI feedback in MTC enhancement", 3GPP TSG-RAN WG1 Meeting #82 R1-154461, Beijing, People's Republic of China, Aug. 24-28, 2015.
Nokia Networks, "Physical Downlink Control Channel for MTC", 3GPP TSG-RAN WG1 Meeting #80bis R1-151305, Belgrade, Serbia, Apr. 20-24, 2015.
First Office Action of the Japanese appiication No. 2019-536940, dated May 21, 2021.
First Office Action of the Korean application No. 10-2019-7022564, dated Jun. 16, 2021.
Second Office Action of the Canadian appiication No. 3053261, dated Jun. 25, 2021.
International Search Report in the international application No. PCTICN201 7/070485, dated Sep. 27, 2017.
Written Opinion of the International Search Authority in the international application No. PCT/CN2017/070485, dated Sep. 27, 2017.
International Search Report in the international application No. PCT/CN2017/083076, dated Sep. 27, 2017.
Written Opinion of the International Search Authority in the international application No. PCT/CN2017/083076, dated Sep. 27, 2017.
Interdigital Communications:"Bandwidth adaptation in NR", 3GPP Draft; R1-1612315, 3rd Generation Partnership Project (3GPP), Mobile Competence Centre; 650, Route Des Lucioles; F-06921 Sophia-Antipolis Cedex; France, vol. RAN WG1 No. Reno. USA; Nov. 14, 2016-Nov. 18, 2016 Nov. 13, 2016 (Nov. 13, 2016).
Huawei, et al.: "Support of fexible bandwidth", 3GPP Draft; R1-1608841, 3rd Generation Partnership Project (3GPP), Mobile Competence Centre; 650, Route Des Lucioles: F-06921 Sophia-Antipolis Cedex; France, vol. RAN WG1, No. Lisbon, Portugal; Oct. 10, 2016-Oct. 14, 2016 Oct. 9, 2016(Oct. 9, 2016).
Supplementary European Search Report in the European application No. 17890822.4, dated Nov. 21, 2019.
Notice of Allowance of the Russian application No. 2019124507, dated Jul. 29, 2020.
First Office Action of the Canadian application No. 3053261, dated Sep. 18, 2020.
Huawel, HiSilicon; "Mechanisms of bandwidth adaptation for control and data reception in single-carrier and multi-carrier cases", 3GPP TSG RAN WG1 Meeting #87, R1-1611655, Reno, USA, Nov. 14-18, 2016.
First Office Action of the Indian application No. 201917031251, dated Oct. 31, 2020.
First Office Action of the European application No. 17890822.4, dated Mar. 11, 2021.
3GPP TSG RAN WG1 Meeting #87 R1-1612123; Reno, USA,Nov. 14-18, 2016; Agenda Item: 7.1.2.6; Source: MediaTek Inc.; Title: DL RRM Measurement over Narrowband Reference Signals.
First Office Action of the U.S. Appl. No. 16/476,195, dated Aug. 13, 2020.
Notice of Allowance of the U.S. Appl. No. 16/476,195, dated Jan. 28, 2021.
First Office Action of the Indonesian application No. P00201906860, dated Apr. 7, 2022.
First Office Action of the Chinese application No. 201780081706.7, dated Jun. 16, 2022.
Office Action of the Australian appiication No. 2017391230, dated Oct. 21, 2021.
Second Office Action of the European application No. 17890822.4, dated Nov. 15, 2021.
First Office Action of the Vietnamese application No. 1-2019-04296, dated Aug. 16, 2022.

* cited by examiner

MEASURING METHOD FOR REALIZING CSI OF DOWNLINK CHANNEL WITH REDUCED TERMINAL POWER CONSUMPTION, BASE STATION, AND TERMINAL

CROSS-REFERENCE TO RELATED APPLICATIONS

This is a continuation application of US Application Ser. No. 16/476,195 filed on Jul. 5, 2019, which is a national phase application of PCT Application No. PCT/CN2017/083076 filed on May 4, 2017, and claims priority to PCT Application No. PCT/CN2017/070485 filed on Jan. 6, 2017, the entire contents of which are incorporated herein by reference in their entirety.

TECHNICAL FIELD

The disclosure relates to the technical field of communications, and particularly to a measurement method, a base station and a terminal.

BACKGROUND

In a Long Term Evolution (LTE) system, a terminal receives downlink signals on the whole system bandwidth. Herein, the downlink signals include a physical downlink control channel (PDCCH) and downlink common reference signals such as cell-specific reference signals (CRSs) and channel state information reference signals (CSI-RSs). System bandwidths supported by the LTE system include 1.4 MHz, 3 MHz, 5 MHz, 10 MHz, 15 MHz and 20 MHz. Herein, 20 MHz and 10 MHz are typical and frequently used system bandwidths, where the system bandwidth of 20 MHz in a downlink channel corresponds to 100 Physical Resource Blocks (PRBs), and the system bandwidth of 10 MHz in a downlink channel corresponds to 50 PRBs.

In the existing LTE system, a terminal may keep performing blind detection on a PDCCH on the whole downlink system bandwidth, which may bring relatively high power consumption of the terminal. Particularly in a 5-Generation (5G) system and a subsequent mobile communication system with a relatively large system bandwidth, a bandwidth of a carrier may be relatively large and, for example, may reach 200 MHz. Therefore, if the terminal still receives the PDCCH on the whole bandwidth as in the LTE system, i.e., the 4-Generation (4G) system, power consumption of the terminal may be very high. A terminal supporting Machine Type Communication (MTC) may demodulate a downlink signal on a bandwidth of 1.4 MHz, i.e., 6 PRBs. For such a terminal, power consumption of the terminal may be reduced because of decrease of a downlink bandwidth. However, such a terminal may only work on a relatively narrow bandwidth, for example, 6 PRBs, and thus functions of the terminal may be restricted to a large extent. For example, in a cellular system, a terminal measures channel state information (CSI) of a downlink channel and reports the same to a base station. The base station takes the CSI reported by the terminal as an important basis for scheduling downlink data. The terminal usually measures the CSI of the downlink channel by measuring downlink reference signals such as CRSs or CSI-RSs. Since the two downlink reference signals are sent by the base station on the whole system bandwidth, it is difficult to accurately obtain the CSI of the downlink channel. Therefore, it is necessary to solve problems about measurement of CSI of a downlink channel by a terminal operating on a narrow bandwidth.

SUMMARY

Embodiments of the disclosure provide a measurement method, a base station and a terminal, to implement flexible switching of the terminal between a narrow bandwidth and a system bandwidth, so as to reduce power consumption of the terminal while implementing measurement of CSI of a downlink channel.

A fast aspect of the embodiments of the disclosure provides a measurement method, which may include the following operations.

A base station sends a switching message of a narrow-bandwidth receiving mode to a terminal, to instruct the terminal to switch to a specified narrow bandwidth for information reception.

When CSI of a downlink channel needs to be measured, the base station schedules the terminal to sequentially switch to at least two different measurement narrow bandwidths to measure downlink reference signals.

Herein, each of the narrow bandwidth and the at least two different measurement narrow bandwidths may be smaller than a system bandwidth.

In a possible implementation mode, the measurement method may further include sending downlink control information (DCI) for the terminal in a PDCCH on the narrow bandwidth.

The DCI may be in a terminal-specific search space corresponding to the terminal and at a control channel element aggregation level corresponding to the terminal.

In a possible implementation mode, if the at least two different measurement narrow bandwidths include a first measurement narrow bandwidth and a second measurement narrow bandwidth, the operation that the base station schedules the terminal to sequentially switch to the at least two different measurement narrow bandwidths to measure the downlink reference signals when the CSI of the downlink channel needs to be measured may include the following operations.

The base station configures measurement parameters for the terminal to measure the downlink reference signals, the measurement parameters including a period in which the terminal measures the downlink reference signals, first time information used for the terminal to measure the downlink reference signals on the first measurement narrow bandwidth in the period and second time information used for the terminal to measure the downlink reference signals on the second measurement narrow bandwidth in the period, and sends the measurement parameters to the terminal, the period including a duration in which the terminal enters the narrow-bandwidth receiving mode, switches to the first measurement narrow bandwidth to measure the downlink reference signals, switches to the second measurement narrow bandwidth to measure the downlink reference signals, and enters the narrow-bandwidth receiving mode again.

The terminal is scheduled to sequentially switch to the first measurement narrow bandwidth and the second measurement narrow bandwidth to measure the downlink reference signals according to the measurement parameters.

In a possible implementation mode, before the operation that the terminal is scheduled to sequentially switch to the first measurement narrow bandwidth and the second measurement narrow bandwidth to measure the downlink reference signals according to the measurement parameters, the method may further include sending triggering signal in the PDCCH on the narrow bandwidth. The triggering signal is to trigger the terminal to switch to the first measurement narrow bandwidth and the second measurement narrow bandwidth to measure the downlink reference signals according to the measurement parameters.

In a possible implementation mode, the measurement parameters configured by the base station for the terminal may include at least two different configurations, and when the measurement parameters is sent to the terminal, configuration patterns of the measurement parameters for the terminal may be indicated through the PDCCH on the narrow bandwidth.

If the present measurement parameters need to be modified, the base station may instruct the terminal to use another set of configured measurement parameters for measurement through the PDCCH on the narrow bandwidth.

In a possible implementation mode, if the at least two different measurement narrow bandwidths include the first measurement narrow bandwidth and the second measurement narrow bandwidth, the operation that the base station schedules the terminal to sequentially switch to the at least two different measurement narrow bandwidths to measure the downlink reference signals when the CSI of the downlink channel needs to be measured may include the following operations.

The base station sends first DCI in the PDCCH on the narrow bandwidth, the first DC1 including bandwidth information of the first measurement narrow bandwidth, and starting time and ending time for measurement on the first measurement narrow bandwidth, and schedules the terminal to switch to the first measurement narrow bandwidth to measure the downlink reference signals.

After the terminal completes measurement on the first measurement narrow bandwidth and switches back to the narrow bandwidth, the base station sends second DCI in the PDCCIH on the narrow bandwidth, the second DCI including bandwidth information of the second measurement narrow bandwidth, and starting time and ending time for measurement on the second measurement narrow bandwidth, and schedules the terminal to switch to the second measurement narrow bandwidth to measure the downlink reference signals.

In a possible implementation mode, the base station may configure, for bandwidth information of the at least two measurement narrow bandwidths, respective measurement narrow bandwidth indexes. The measurement narrow bandwidth index is to indicate the bandwidth information of the measurement narrow bandwidth, to which the terminal is to switch.

In a possible implementation mode, the measurement method is characterized by further including the following operations.

The CSI, reported by the terminal, of the downlink channel is received, the CSI of the downlink channel being obtained by calculating, by the terminal, measurement results of the at least two different measurement narrow bandwidths by using a preset algorithm. Or, the measurement results, reported by the terminal, of the at least two measurement narrow bandwidths are received and the CSI of the downlink channel is calculated according to the preset algorithm.

A measurement stopping message is sent to the terminal to instruct the terminal to stop measuring the downlink reference signals.

In a possible implementation mode, the preset algorithm may include weighted summation, averaging or averaging without extremums.

A second aspect of the embodiments of the disclosure provides a measurement method, which may include the following operations.

A terminal receives a switching message of a narrow-bandwidth receiving mode from a base station, and switches to a specified narrow bandwidth for information reception.

When CSI of a downlink channel needs to be measured, the terminal sequentially switches to at least two different measurement narrow bandwidths to measure a downlink reference signals according to scheduling of the base station.

Herein, each of the narrow bandwidth and the at least two different measurement narrow bandwidths may be smaller than a system bandwidth.

In a possible implementation mode, the measurement method may further include the following operation.

DCI for the terminal is received in a PDCCH on the narrow bandwidth.

The DCI may be in a terminal-specific search space corresponding to the terminal and at a control channel element aggregation level corresponding to the terminal.

In a possible implementation mode, if the at least two different measurement narrow bandwidths include a first measurement narrow bandwidth and a second measurement narrow bandwidth, the operation of sequentially switching to the at least two different measurement narrow bandwidths to measure the downlink reference signals according to scheduling of the base station when the CSI of the downlink channel needs to be measured may include the following operations.

Measurement parameters configured by the base station for the terminal to measure the downlink reference signals are received, the measurement parameters including a period in which the terminal measures the downlink reference signals, first time information used for the terminal to measure the downlink reference signals on the first measurement narrow bandwidth in the period and second time information used for the terminal to measure the downlink reference signals on the second measurement narrow bandwidth in the period, the measurement parameters being sent to the terminal, and the period including a duration in which the terminal enters the narrow-bandwidth receiving mode, switches to the first measurement narrow bandwidth to measure the downlink reference signals and switched to the second measurement narrow bandwidth to measure the downlink reference signals and enters the narrow-bandwidth receiving mode again.

The terminal sequentially switches to the first measurement narrow bandwidth and the second measurement narrow bandwidth to measure the downlink reference signals according to the measurement parameters.

In a possible implementation mode, before the operation of sequentially switching to the first measurement narrow bandwidth and the second measurement narrow bandwidth to measure the downlink reference signals according to the measurement parameters, the method may further include receiving a triggering signal sent by the base station in the PDCCH on the narrow bandwidth. The triggering signal is to trigger the terminal to switch to the system bandwidth to measure the downlink reference signals according to the measurement parameters.

In a possible implementation mode, the measurement parameters configured for the terminal by the base station may include at least two different configurations, and when the measurement parameters is received, configuration patterns of the measurement parameters may be determined through an indication of the PDCCH on the narrow bandwidth.

If the base station needs to modify the present measurement parameters, information sent by the base station through the PDCCH on the narrow bandwidth and instructing the terminal to use another set of configured measurement parameters for measurement is received.

In a possible implementation mode, if the at least two different measurement narrow bandwidths include a first measurement narrow bandwidth and a second measurement narrow bandwidth, the operation of sequentially switching to the at least two different measurement narrow bandwidths to measure the downlink reference signals according to scheduling of the base station when the CSI of the downlink channel needs to be measured may include the following operations.

First DCI sent by the base station in the PDCCH on the narrow bandwidth is received, the first DCI including bandwidth information of the first measurement narrow bandwidth, and starting time and ending time for measurement on the first measurement narrow bandwidth, and the terminal switches to the first measurement narrow bandwidth to measure the downlink reference signals.

After completion of measurement on the first measurement narrow bandwidth and switching back to the narrow bandwidth, second DCI sent by the base station in the PDCCH on the narrow bandwidth is received, the second DCI including bandwidth information of the second measurement narrow bandwidth, and starting time and ending time for measurement on the second measurement narrow bandwidth, and the terminal switches to the second measurement narrow bandwidth to measure the downlink reference signals.

In a possible implementation mode, measurement narrow bandwidth indexes, each configured for bandwidth information of a respective one of the at least two measurement narrow bandwidths by the base station, may be received, the measurement narrow bandwidth index being arranged to indicate the bandwidth information of the measurement narrow bandwidth, to which the terminal is to switch to.

In a possible implementation mode, the measurement method may further include the following operations.

The CSI of the downlink channel is reported to the base station, the CSI of the downlink channel being obtained by calculating, by the terminal, measurement results of the at least two different measurement narrow bandwidths by using a preset algorithm. Or, the measurement results of the at least two measurement narrow bandwidths are reported to the base station for the base station to calculate the CSI of the downlink channel according to the preset algorithm.

A measurement stopping message sent by the base station is received, and measurement of the downlink reference signals is stopped.

In a possible implementation mode, the preset algorithm may include weighted summation, averaging or averaging without extremums.

A third aspect of the embodiments of the disclosure provides a base station, which may include a sending unit and a scheduling unit.

The sending unit may be arranged to send a switching message of a narrow-bandwidth receiving mode to a terminal, to instruct the terminal to switch to a specified narrow bandwidth for information reception.

The scheduling unit may be arranged to, when CSI of a downlink channel needs to be measured, schedule the terminal to sequentially switch to at least two different measurement narrow bandwidths to measure downlink reference signals.

Herein, each of the narrow bandwidth and the at least two different measurement narrow bandwidths may be smaller than a system bandwidth.

In a possible implementation mode, the sending unit may further be arranged to send DCI for the terminal in a PDCCH on the narrow bandwidth.

The DC may be in a terminal-specific search space corresponding to the terminal and at a control channel element aggregation level corresponding to the terminal.

In a possible implementation mode, if the at least two different measurement narrow bandwidths include a first measurement narrow bandwidth and a second measurement narrow bandwidth, the scheduling unit may specifically be arranged to configure measurement parameters for the terminal to measure the downlink reference signals and send the measurement parameters to the terminal. The measurement parameters include a period in which the terminal measures the downlink reference signals, first time information used for the terminal to measure the downlink reference signals on the first measurement narrow bandwidth in the period, and second time information used for the terminal to measure the downlink reference signals on the second measurement narrow bandwidth in the period. The period includes a duration in which the terminal enters the narrow-bandwidth receiving mode, switches to the first measurement narrow bandwidth to measure the downlink reference signals and switches to the second measurement narrow bandwidth to measure the downlink reference signals, and enters the narrow-bandwidth receiving mode again.

The scheduling unit may specifically further be arranged to schedule the terminal to sequentially switch to the first measurement narrow bandwidth and the second measurement narrow bandwidth to measure the downlink reference signals according to the measurement parameters.

In a possible implementation mode, before the terminal is scheduled to sequentially switch to the first measurement narrow bandwidth and the second measurement narrow bandwidth to measure the downlink reference signals according to the measurement parameters. The sending unit may further be arranged to send a triggering signal in the PDCCH on the narrow bandwidth. The triggering signal is to trigger the terminal to switch to the first measurement narrow bandwidth and the second measurement narrow bandwidth to measure the downlink reference signals according to the measurement parameters.

In a possible implementation mode, the measurement parameters configured for the terminal by the base station may include at least two different configurations, and when the sending unit sends the measurement parameters to the terminal, the scheduling unit may further be arranged to indicate the terminal configuration patterns of the measurement parameters through the PDCCH on the narrow bandwidth.

If the present measurement parameters need to be modified, the scheduling unit may further be arranged to instruct the terminal to use another configured measurement parameters for measurement through the PDCCH on the narrow bandwidth.

In a possible implementation mode, if the at least two different measurement narrow bandwidths include the first measurement narrow bandwidth and the second measurement narrow bandwidth, the scheduling unit may specifically be arranged to send first DCI in the PDCCH on the narrow bandwidth, and schedule the terminal to switch to the first measurement narrow bandwidth to measure the downlink reference signals. The first DCI includes bandwidth information of the first measurement narrow bandwidth, and starting time and ending time for measurement on the first measurement narrow bandwidth.

The scheduling unit may specifically further be arranged to, after the terminal completes measurement on the first measurement narrow bandwidth and switches back to the narrow bandwidth, send second DCI in the PDCCH on the narrow bandwidth, and schedule the terminal to switch to the second measurement narrow bandwidth to measure the downlink reference signals. The second DCI includes bandwidth information of the second measurement narrow bandwidth, and starting time and ending time for measurement on the second measurement narrow bandwidth. In a possible implementation mode, the scheduling unit may further be arranged to configure, for bandwidth information of the at least two measurement narrow bandwidths, respective measurement narrow bandwidth indexes. The measurement narrow bandwidth index is to indicate the bandwidth information of the measurement narrow bandwidth, to which the terminal is to switch.

In a possible implementation mode, the scheduling unit may further be arranged to receive the CSI, reported by the terminal, of the downlink channel, the CSI of the downlink channel being obtained by calculating, by the terminal, measurement results of the at least two different measurement narrow bandwidths by using a preset algorithm, or receive the measurement results, reported by the terminal, of the at least two measurement narrow bandwidths and calculate the CSI of the downlink channel by using the preset algorithm.

The scheduling unit may further be arranged to send a measurement stopping message to the terminal, to instruct the terminal to stop measuring the downlink reference signals.

In a possible implementation mode, the preset algorithm may include weighted summation, averaging or averaging without extremums.

A fourth aspect of the embodiments of the disclosure provides a base station, which may include a processor, a memory, a transceiver and a bus. The processor, the memory and the transceiver may be connected through the bus. The transceiver may be arranged to send and receive signals and communicate with a terminal. The memory may be arranged to store a set of program codes. The processor may be arranged to call the program codes stored in the memory to execute the following operations.

A switching message of a narrow-bandwidth receiving mode is sent, through the transceiver, to the terminal, to instruct the terminal to switch to a specified narrow bandwidth for information reception.

When CSI of a downlink channel needs to be measured, the terminal is scheduled to sequentially switch to at least two different measurement narrow bandwidths to measure downlink reference signals.

Herein, each of the narrow bandwidth and the at least two different measurement narrow bandwidths may be smaller than a system bandwidth.

In a possible implementation mode, the processor may further be arranged to send, through the transceiver, DCI for the terminal in a PDCCH on the narrow bandwidth.

The DCI may be in a terminal-specific search space corresponding to the terminal and at a control channel element aggregation level corresponding to the terminal.

In a possible implementation mode, if the at least two different measurement narrow bandwidths include a first measurement narrow bandwidth and a second measurement narrow bandwidth, the processor may specifically be arranged to configure measurement parameters for the terminal to measure the downlink reference signals, and send, through the transceiver, the measurement parameters to the terminal. The measurement parameters include a period in which the terminal measures the downlink reference signals, first time information used for the terminal to measure the downlink reference signals on the first measurement narrow bandwidth in the period and second time information used for the terminal to measure the downlink reference signals on the second measurement narrow bandwidth in the period. The period includes a duration in which the terminal enters the narrow-bandwidth receiving mode, switches to the first measurement narrow bandwidth to measure the downlink reference signals, switches to the second measurement narrow bandwidth to measure the downlink reference signals, and enters the narrow-bandwidth receiving mode again.

The processor may specifically further be arranged to schedule the terminal to sequentially switch to the first measurement narrow bandwidth and the second measurement narrow bandwidth to measure the downlink reference signals according to the measurement parameters.

In a possible implementation mode, before the terminal is scheduled to sequentially switch to the first measurement narrow bandwidth and the second measurement narrow bandwidth to measure the downlink reference signals according to the measurement parameters, the processor may further be arranged to send, through the transceiver, a triggering signal in the PDCCH on the narrow bandwidth.

The triggering signal is to trigger the terminal to switch to the first measurement narrow bandwidth and the second measurement narrow bandwidth to measure the downlink reference signals according to the measurement parameters.

In a possible implementation mode, the measurement parameters configured for the terminal by the base station may include at least two different configurations, and the processor may further be arranged to, when the measurement parameters is sent to the terminal, indicate the terminal configuration patterns of the measurement parameters through the PDCCH on the narrow bandwidth.

If the present measurement parameters need to be modified, the processor may further be arranged to instruct the terminal to use another configured measurement parameters for measurement through the PDCCH on the narrow bandwidth.

In a possible implementation mode, if the at least two different measurement narrow bandwidths include a first measurement narrow bandwidth and a second measurement narrow bandwidth, the processor may specifically be arranged to send first DCI in the PDCCH on the narrow bandwidth, and schedule the terminal to switch to the first measurement narrow bandwidth to measure the downlink reference signals.

The first DCI includes bandwidth information of the first measurement narrow bandwidth, and starting time and ending time for measurement on the first measurement narrow bandwidth.

After the terminal completes measurement on the first measurement narrow bandwidth and switches back to the narrow bandwidth, the base station sends second DCI in the PDCCH on the narrow bandwidth, and schedules the terminal to switch to the second measurement narrow bandwidth to measure the downlink reference signals. The second DCI includes bandwidth information of the second measurement narrow bandwidth, and starting time and ending time for measurement on the second measurement narrow bandwidth.

In a possible implementation mode, the processor may further be arranged to configure, for bandwidth information of the at least two measurement narrow bandwidths, respective measurement narrow bandwidth indexes. The measurement narrow bandwidth index is to indicate the bandwidth information of the measurement narrow bandwidth, to which the terminal is to switch.

In a possible implementation mode, the processor may further be arranged to receive, through the transceiver, the CSI, reported by the terminal, of the downlink channel, the CSI of the downlink channel being obtained by calculating, by the terminal, measurement results of the at least two different measurement narrow bandwidths by using a preset algorithm. Or, the processor may further be arranged to receive, through the transceiver, the measurement results, reported by the terminal, of the at least two measurement narrow bandwidths and calculate the CSI of the downlink channel according to the preset algorithm.

And, the processor may further be arranged to send a measurement stopping message to the terminal, to instruct the terminal to stop measuring the downlink reference signals.

In a possible implementation mode, the preset algorithm may include weighted summation, averaging or averaging without extremums.

A fifth aspect of the embodiments of the disclosure provides a terminal, which may include a receiving unit and a switching unit.

The receiving unit may be arranged to receive a switching message of a narrow-bandwidth receiving mode from a base station.

The switching unit may be arranged to switch to a specified narrow bandwidth for information reception according to the switching message.

The switching unit may further be arranged to, when CSI of a downlink channel needs to be measured, sequentially switch to at least two different measurement narrow bandwidths to measure a downlink reference signals according to scheduling of the base station.

Herein, each of the narrow bandwidth and the at least two different measurement narrow bandwidths may be smaller than a system bandwidth.

In a possible implementation mode, the receiving unit may further be arranged to receive DCI for the terminal in a PDCCH on the narrow bandwidth.

The DCI may be in a terminal-specific search space corresponding to the terminal and at a control channel element aggregation level corresponding to the terminal.

In a possible implementation mode, if the at least two different measurement narrow bandwidths include a first measurement narrow bandwidth and a second measurement narrow bandwidth, the receiving unit may specifically be arranged to receive measurement parameters configured for the terminal by the base station to measure the downlink reference signals. The measurement parameters include a period in which the terminal measures the downlink reference signals, first time information used for the terminal to measure the downlink reference signals on the first measurement narrow bandwidth in the period, and second time information used for the terminal to measure the downlink reference signals on the second measurement narrow bandwidth in the period. The measurement parameters are sent to the terminal. The period includes a duration in which the terminal enters the narrow-bandwidth receiving mode, switches to the first measurement narrow bandwidth to measure the downlink reference signals and switched to the second measurement narrow bandwidth to measure the downlink reference signals and enters the narrow-bandwidth receiving mode again.

The switching unit may specifically be arranged to sequentially switch to the first measurement narrow bandwidth and the second measurement narrow bandwidth to measure the downlink reference signals according to the measurement parameters.

In a possible implementation mode, before the switching unit sequentially switches to the first measurement narrow bandwidth and the second measurement narrow bandwidth to measure the downlink reference signals according to the measurement parameters, the receiving unit may further be arranged to receive a triggering signal sent by the base station in the PDCCH on the narrow bandwidth. The triggering signal is to trigger the terminal to switch to the system bandwidth to measure the downlink reference signals according to the measurement parameters.

In a possible implementation mode, the measurement parameters configured for the terminal by the base station may include at least two different configurations, and when the measurement parameters is received, the switching unit may further be arranged to determine configuration patterns of the measurement parameters through an indication of the PDCCH on the narrow bandwidth.

If the base station needs to modify the present measurement parameters, the receiving unit may further be arranged to receive information sent by the base station through the PDCCH on the narrow bandwidth and instructing the terminal to use another set of configured measurement parameters for measurement.

In a possible implementation mode, if the at least two different measurement narrow bandwidths include a first measurement narrow bandwidth and a second measurement narrow bandwidth, the receiving unit may specifically be arranged to receive first DCI sent by the base station in the PDCCH on the narrow bandwidth. The first DCI includes bandwidth information of the first measurement narrow bandwidth, and starting time and ending time for measurement on the first measurement narrow bandwidth.

The switching unit may specifically be arranged to switch to the first measurement narrow bandwidth to measure the downlink reference signals.

After completion of measurement on the first measurement narrow bandwidth and switching back to the narrow bandwidth, the receiving unit may further be arranged to receive second DCI sent by the base station in the PDCCH on the narrow bandwidth. The second DCI includes bandwidth information of the second measurement narrow bandwidth and starting time and ending time for measurement on the second measurement narrow bandwidth. The switching unit may further be arranged to switch to the second measurement narrow bandwidth to measure the downlink reference signals.

In a possible implementation mode, the receiving unit may further be arranged to receive measurement narrow bandwidth indexes, each configured for bandwidth information of a respective one of the at least two measurement narrow bandwidths by the base station. The measurement narrow bandwidth index is to indicate the bandwidth information of the measurement narrow bandwidth, to which the terminal is to switch.

In a possible implementation mode, the switching unit may further be arranged to report the CSI of the downlink channel to the base station, the CSI of the downlink channel being obtained by calculating, by the terminal, measurement results of the at least two different measurement narrow bandwidths by using a preset algorithm. Or, the switching unit may further be arranged to report the measurement results of the at least two measurement narrow bandwidths to the base station for the base station to calculate the CSI of the downlink channel according to the preset algorithm.

And, the switching unit may further be arranged to receive a measurement stopping message sent by the base station and stop measuring the downlink reference signals.

In a possible implementation mode, the preset algorithm may include weighted summation, averaging or averaging without extremums.

A sixth aspect of the embodiments of the disclosure provides a terminal, which may include a processor, a memory, a transmitter, a receiver and a bus. The processor, the memory, the transmitter and the receiver may be connected through the bus. The transmitter may be arranged to transmit a signal. The receiver may be arranged to receive the signal. The transmitter and the receiver may be independently arranged respectively or integrated. The memory may be arranged to store a set of program codes. The processor may be arranged to call the program codes stored in the memory to execute the following operations.

A switching message of a narrow-bandwidth receiving mode is received, through the receiver, from a base station for switching to a specified narrow bandwidth for information reception.

When CSI of a downlink channel needs to be measured, switching to at least two different measurement narrow bandwidths to measure a downlink reference signals is sequentially executed according to scheduling of the base station.

Herein, each of the narrow bandwidth and the at least two different measurement narrow bandwidths may be smaller than a system bandwidth.

In a possible implementation mode, the processor may further be arranged to receive, through the receiver, DCI for the terminal in a PDCCH on the narrow bandwidth.

The DC may be in a terminal-specific search space corresponding to the terminal and at a control channel element aggregation level corresponding to the terminal.

In a possible implementation mode, if the at least two different measurement narrow bandwidths include a first measurement narrow bandwidth and a second measurement narrow bandwidth, the processor may specifically be arranged to receive, through the receiver, measurement parameters configured for the terminal by the base station to measure the downlink reference signals. The measurement parameters include a period in which the terminal measures the downlink reference signals, first time information used for the terminal to measure the downlink reference signals on the first measurement narrow bandwidth in the period and second time information used for the terminal to measure the downlink reference signals on the second measurement narrow bandwidth in the period. The measurement parameters are sent to the terminal. The period includes a duration in which the terminal enters the narrow-bandwidth receiving mode, switches to the first measurement narrow bandwidth to measure the downlink reference signals, switches to the second measurement narrow bandwidth to measure the downlink reference signals, and enters the narrow-bandwidth receiving mode again; and And, the processor may specifically further be arranged to sequentially switch to the first measurement narrow bandwidth and the second measurement narrow bandwidth to measure the downlink reference signals according to the measurement parameters.

In a possible implementation mode, the processor may further be arranged to, before switching to the first measurement narrow bandwidth and the second measurement narrow bandwidth to measure the downlink reference signals is sequentially executed according to the measurement parameters, receive, through the receiver, a triggering signal sent by the base station in the PDCCH on the narrow bandwidth. The triggering signal is to trigger the terminal to switch to the system bandwidth to measure the downlink reference signals according to the measurement parameters.

In a possible implementation mode, the measurement parameters configured for the terminal by the base station may include at least two different configurations, and when the measurement parameters are received, the processor may further be arranged to determine configuration patterns of the measurement parameters through an indication of the PDCClH on the narrow bandwidth.

If the base station needs to modify the present measurement parameters, the processor may further be arranged to receive, through the receiver, information sent by the base station through the PDCCH on the narrow bandwidth and instructing the terminal to use another set of configured measurement parameters for measurement.

In a possible implementation mode, if the at least two different measurement narrow bandwidths include a first measurement narrow bandwidth and a second measurement narrow bandwidth, the processor may specifically be arranged to receive, through the receiver, first DCI sent by the base station in the PDCCH on the narrow bandwidth, and switch the terminal to the first measurement narrow bandwidth to measure the downlink reference signals. The first DCI includes bandwidth information of the first measurement narrow bandwidth, and starting time and ending time for measurement on the first measurement narrow bandwidth.

The processor may further be arranged to, after completion of measurement on the first measurement narrow bandwidth and switching back to the narrow bandwidth, receive, through the receiver, second DCI sent by the base station in the PDCCH on the narrow bandwidth, and switch the terminal to the second measurement narrow bandwidth to measure the downlink reference signals. The second DCI includes bandwidth information of the second measurement narrow bandwidth, and starting time and ending time for measurement on the second measurement narrow bandwidth.

In a possible implementation mode, the processor may further be arranged to receive measurement narrow bandwidth indexes, each configured for bandwidth information of a respective one of the at least two measurement narrow bandwidths by the base station. The measurement narrow bandwidth index is to indicate the bandwidth information of the measurement narrow bandwidth, to which the terminal is to switch.

In a possible implementation mode, the processor may further be arranged to report, through the transmitter, the CSI of the downlink channel to the base station, the CSI of the downlink channel being obtained by calculating, by the terminal, measurement results of the at least two different measurement narrow bandwidths by using a preset algorithm. Or, the processor may further be arranged to report the measurement results of the at least two measurement narrow bandwidths to the base station for the base station to calculate the CSI of the downlink channel according to the preset algorithm.

And, the processor may further be arranged to receive, through the receiver, a measurement stopping message sent by the base station and stop measuring the downlink reference signals.

In a possible implementation mode, the preset algorithm may include weighted summation, averaging or averaging without extremums.

A seventh aspect of the embodiments of the disclosure provides a computer storage medium, which includes a set of program codes to execute the method in any implementation mode of the first aspect of the embodiments of the disclosure.

An eighth aspect of the embodiments of the disclosure provides a computer storage medium, which includes a set of program codes to execute the method in any implementation mode of the second aspect of the embodiments of the disclosure.

A ninth aspect of the embodiments of the disclosure provides a measurement method, which may include the following operations.

A base station sends a switching message of a narrow-bandwidth receiving mode to a terminal, to instruct the terminal to switch to a specified narrow bandwidth for information reception.

When at least one downlink synchronization signal needs to be measured, the base station schedules the terminal to switch to a measurement narrow bandwidth corresponding to the at least one downlink synchronization signal for measurement.

Herein, each of the narrow bandwidth and the measurement narrow bandwidth may be smaller than a system bandwidth.

A tenth aspect of the embodiments of the disclosure provides a measurement method, which may include the following operations.

A terminal receives a switching message of a narrow-bandwidth receiving mode from a base station and switches to a specified narrow bandwidth for information reception.

When at least one downlink synchronization signal needs to be measured, switching to a measurement narrow bandwidth corresponding to the at least one downlink synchronization signal for measurement is executed according to scheduling of the base station.

Herein, each of the narrow bandwidth and the measurement narrow bandwidth may be smaller than a system bandwidth.

An eleventh aspect of the embodiments of the disclosure provides a base station, which may include a sending unit and a scheduling unit.

The sending unit may send a switching message of a narrow-bandwidth receiving mode to a terminal, to instruct the terminal to switch to a specified narrow bandwidth for information reception.

When at least one downlink synchronization signal needs to be measured, the scheduling unit may schedule, by the base station, the terminal to switch to a measurement narrow bandwidth corresponding to the at least one downlink synchronization signal for measurement.

Herein, each of the narrow bandwidth and the measurement narrow bandwidth may be smaller than a system bandwidth.

A twelfth aspect of the embodiments of the disclosure provides a base station, which may include a processor, a memory, a transceiver and a bus. The processor, the memory and the transceiver may be connected through the bus. The transceiver may be arranged to send and receive signals and communicate with a terminal. The memory may be arranged to store a set of program codes. The processor may be arranged to call the program codes stored in the memory to execute the following operations.

A switching message of a narrow-bandwidth receiving mode is sent, through the transceiver, to the terminal to instruct the terminal to switch to a specified narrow bandwidth for information reception.

When at least one downlink synchronization signal needs to be measured, the base station schedules the terminal to switch to a measurement narrow bandwidth corresponding to the at least one downlink synchronization signal for measurement.

Herein, each of the narrow bandwidth and the measurement narrow bandwidth may be smaller than a system bandwidth.

A thirteenth aspect of the embodiments of the disclosure provides a terminal, which may include a receiving unit and a switching unit.

The receiving unit may be arranged to receive a switching message of a narrow-bandwidth receiving mode from a base station.

The switching unit may be arranged to switch to a specified narrow bandwidth for information reception according to the switching message.

The switching unit may further be arranged to, when at least one downlink synchronization signal needs to be measured, switch to a measurement narrow bandwidth corresponding to the at least one downlink synchronization signal for measurement according to scheduling of the base station.

Herein, each of the narrow bandwidth and the measurement narrow bandwidth may be smaller than a system bandwidth.

A fourteenth aspect of the embodiments of the disclosure provides a terminal, which may include a processor, a memory, a transmitter, a receiver and a bus. The processor, the memory, the transmitter and the receiver may be connected through the bus. The transmitter may be arranged to transmit a signal. The receiver may be arranged to receive the signal. The transmitter and the receiver may be independently arranged respectively or integrated. The memory may be arranged to store a set of program codes. The processor may be arranged to call the program codes stored in the memory to execute the following operations.

A switching message of a narrow-bandwidth receiving mode is received, through the receiver, from a base station.

Switching to a specified narrow bandwidth for information reception is executed according to the switching message.

When at least one downlink synchronization signal needs to be measured, switching to a measurement narrow bandwidth corresponding to the at least one downlink synchronization signal for measurement is executed according to scheduling of the base station.

Herein, each of the narrow bandwidth and the measurement narrow bandwidth may be smaller than a system bandwidth.

A fifteenth aspect of the embodiments of the disclosure provides a computer storage medium, which includes a set of program codes to execute the method in any implementation mode of the ninth aspect of the embodiments of the disclosure.

A sixteenth aspect of the embodiments of the disclosure provides a computer storage medium, which includes a set of program codes to execute the method in any implementation mode of the tenth aspect of the embodiments of the disclosure.

Implementing the embodiments of the disclosure may achieve the following beneficial effects.

The base station configures the switching message to indicate the narrow-bandwidth receiving mode, to which the terminal is to switch. In the narrow-bandwidth receiving mode, the terminal may receive a signal on the narrow bandwidth smaller than the system bandwidth, so that the terminal does not have to detect the relatively large system bandwidth, and power consumption of the terminal and a signal detection delay may be reduced. The PDCCH on the narrow bandwidth is configured to only include the UE-specific search space and a fixed control channel element aggregation level, so that the amount of information to be detected by the terminal may be reduced, and the power consumption of the terminal may further be reduced. When the CSI of the downlink channel needs to be measured, the base station may schedule the terminal to switch to the at least two different measurement narrow bandwidths to measure the downlink reference signals, and then the terminal or the base station calculates the CSI of the downlink channel according to the results obtained by measurement on different measurement narrow bandwidths, to finally balance the power consumption of the terminal and system performance, thus ensuring that the CSI of the downlink channel is obtained to provide a reference for scheduling downlink data.

BRIEF DESCRIPTION OF DRAWINGS

In order to describe the technical solutions in the embodiments of the disclosure or a conventional art more clearly, the drawings required to be used in descriptions about the embodiments will be simply introduced below. It is apparent that the drawings described below are only some embodiments of the disclosure. Other drawings may further be obtained by those of ordinary skill in the art according to these drawings without creative work.

DETAILED DESCRIPTION

Terms "include" and "have" in the specification, claims and drawings of the disclosure and any transformation thereof are intended to cover nonexclusive inclusions. For example, a process, method, system, product or device including a series of actions or units is not limited to the actions or units which have been listed, but alternatively further includes actions or units which are not listed or alternatively further includes other actions or units intrinsic to the process, the method, the product or the device.

Along with constant increase of communication requirements of people, communication technologies are developing fast, and larger bandwidths, higher uplink/downlink transmission speeds and the like may be provided for users. For example, in a 5G system, a system bandwidth of 200 MHz may be provided. However, along with extension of system bandwidths, if a terminal receives a PDCCH on a relatively large system bandwidth, power consumption of the terminal may be relatively high, and if the terminal keeps working on a relatively narrow bandwidth, system performance may be affected and the terminal may not normally measure CSI of the downlink channel, thereby bringing influence to transmission of downlink data. Therefore, the embodiments of the disclosure provide a measurement method. Then, a terminal may switch to a narrow bandwidth smaller than a system bandwidth for work, thereby reducing power consumption of the terminal. When CSI of a downlink channel needs to be measured, the terminal may also switch to two or more measurement narrow bandwidths to measure downlink reference signals, and then the CSI of the downlink channel is obtained according to measurement results. For convenience of description, descriptions will be made with a 5G system as an example in the embodiments of the disclosure. Those skilled in the art should know that the implementation modes in the embodiments of the disclosure may also be applied to an existing communication system and future communication systems of higher levels such as 6-Generation (6G) and 7-Generation (7G). There are no limits made in the embodiments of the disclosure.

A measurement method and device of the embodiments of the disclosure will be described below in combination with the drawings in detail.

Figure 1:
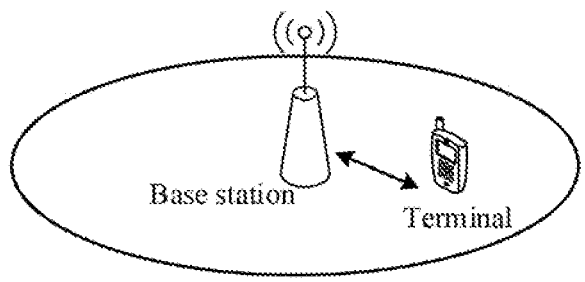
FIG. 1 illustrates a diagram of an architecture of a communication system according to an embodiment of the disclosure.

FIG. 1 illustrates a diagram of an architecture of a communication system according to an embodiment of the disclosure. Herein, a base station and at least one terminal may be included. The terminal may also be called UE.

Herein, the base station may be an Evolved Node B (eNB), a Node B (NB), a Base Station Controller (BSC), a Base Transceiver Station (BTS), a home base station (for example, a Home evolved NodeB or Home Node B (HNB)), a BaseBand Unit (BBU) and the like. It may also be called a base station transceiver, a wireless base station, a wireless transceiver, a transceiver function, a Base Station Subsystem (BSS) or some other proper terms by those skilled in the art. It may bear scheduling DCI, which may specifically include a transmission format, resource allocation, an uplink scheduling grant, power control, uplink retransmission information and the like, in a PDCCH, and may transmit downlink data of a service to UE and receive a retransmission feedback and the like of the terminal. The base station may schedule the terminal to work in a narrow-bandwidth working mode, or may schedule the terminal to switch between a narrow bandwidth and a system bandwidth, and when CSI of a downlink channel needs to be measured, schedule the terminal to switch to a measurement narrow bandwidth to measure downlink reference signals.

Herein, the terminal may include a cell phone, a smart phone, a Session Initiation Protocol (SIP) phone, a laptop computer, a Personal Digital Assistant (PDA), satellite ratio, a global positioning system, a multimedia device, a video device, a digital audio player (for example, a Moving Picture Experts Group Audio Layer-3 (MP3) player), a camera, a game console or any other device with a similar function. The terminal may also be called a mobile station, a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handheld device, a user agent, a mobile client, a client or some other proper terms by those skilled in the art. The terminal may receive control information configured by the base station and a time/frequency-domain resource scheduled by the base station to transmit uplink service data and retransmission feedback information, or may switch between the narrow bandwidth and the measurement narrow bandwidth according to scheduling of the base station to implement measurement of the CSI of the downlink channel.

For reducing power consumption of the terminal, the terminal may be arranged to work on the narrow bandwidth smaller than the system bandwidth in the embodiments of the disclosure. The measurement method of the disclosure will be described below in combination with FIG. 2 to FIG. 10 in detail.

Figure 2:
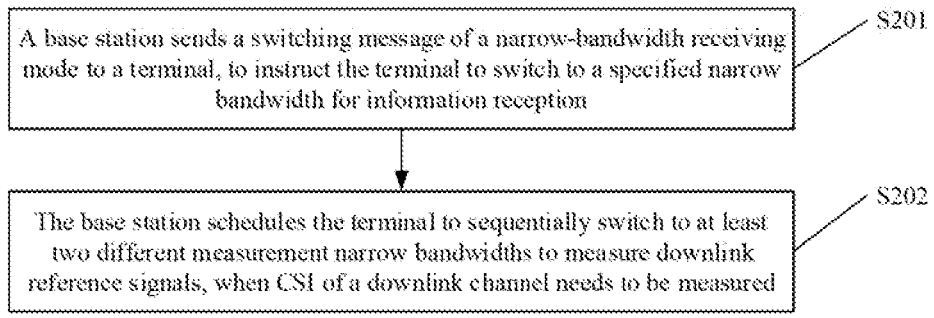
FIG. 2 illustrates a flowchart of a first embodiment of a measurement method according to the disclosure.

FIG. 2 illustrates a flowchart of a first embodiment of a measurement method according to the disclosure. In the embodiment, the measurement method includes the following actions.

In S201, a base station sends a switching message of a narrow-bandwidth receiving mode to a terminal, to instruct the terminal to switch to a specified narrow bandwidth for information reception.

Herein, the narrow bandwidth is smaller than a system bandwidth. The switching message may include time when the terminal is instructed to enter the narrow-bandwidth receiving mode and a position of the narrow bandwidth on a frequency band when the narrow-bandwidth receiving mode is entered.

Alternatively, the time of being in the narrow-bandwidth receiving mode may include starting time of being the narrow-bandwidth receiving mode. The terminal, after receiving the switching message, enters the narrow-bandwidth receiving mode at the specified starting time and switches to the system bandwidth when receiving a message of stopping the narrow-bandwidth receiving mode from the base station, or may also switch from the present narrow bandwidth to another narrow bandwidth or the system bandwidth when receiving a message of switching to the other narrow bandwidth or the system bandwidth from the base station.

The time of being in the narrow-bandwidth receiving mode may further include termination time of being in the narrow-bandwidth receiving mode, besides the starting time of being in the narrow-bandwidth receiving mode. The terminal may enter the narrow-bandwidth receiving mode at the specified starting time and switch back to the system bandwidth for information reception at the specified termination time.

Alternatively, the base station may instruct the terminal to switch to the mode of receiving only on the narrow bandwidth through high-layer signaling such as Radio Resource Control (RRC) or physical-layer signaling such as DCI. The base station may indicate a specific moment when the narrow-bandwidth receiving mode of the terminal is started and a specific position of the narrow bandwidth on the frequency band. Then, the terminal may switch to a specified narrow bandwidth for information reception according to the switching message. In the narrow-bandwidth receiving mode, the terminal may retune its own radio frequency bandwidth to a receiving frequency-domain width, i.e., the specified narrow bandwidth, indicated by a system for the terminal. For example, if the base station indicates that the narrow bandwidth of the terminal is 6 PRBs (for example, 1.4 MHz in case of a 15 KHz subcarrier spacing), the terminal may retune its own radio frequency unit to 6 PRBs at a frequency band position of the narrow bandwidth indicated by the system. In such a case, the terminal may merely receive signals on the 6 PRBs. Since decrease of the receiving radio frequency bandwidth, the power consumption of the terminal may be reduced. The terminal does not have to detect the signals on the relatively large system bandwidth, and merely needs to receive the signals and detect the signals on the narrow bandwidth smaller than the system bandwidth, so that a workload of the terminal is reduced, the power consumption of the terminal is reduced and signal receiving efficiency of the terminal is improved.

It is to be noted that a terminal supporting MTC may demodulate a downlink signal on a bandwidth of 1.4 MHz, i.e., 6 PRBs. For such a terminal, power consumption of the terminal may be reduced because of decrease of a downlink bandwidth. However, such a terminal may only work on a relatively narrow bandwidth, for example, 6 PRBs, and thus functions of the terminal may be restricted to a large extent. The narrow bandwidth the embodiment of the disclosure is smaller than the system bandwidth. That is, the narrow bandwidth in the embodiment of the disclosure is a frequency-domain width smaller than the system bandwidth. This is a concept different from the 1.4 MHz bandwidth in an existing 4G system. For example, 10 MHz and 20 MHz are relatively typical system bandwidth in the existing 4G system, and when the system bandwidth is I0 MHz, the narrow bandwidth in the embodiment of the disclosure may be a bandwidth smaller than 10 MHz, for example, 2 MHz and 5 MHz; and when the system bandwidth is 20 MHz, the narrow bandwidth in the embodiment of the disclosure may be a bandwidth smaller than 20 MHz, for example, 5 MHz, 10 MHz and 12 MHz. When the system bandwidth is 1.4 MHz, the narrow bandwidth in the embodiment of the disclosure may be a bandwidth smaller than 1.4 MHz, for example, 0.6 MHz. For the 5G system with a larger bandwidth, the narrow bandwidth may also be a bandwidth smaller than the system bandwidth in the 5G system.

The power consumption of the terminal is mainly reflected on two aspects, the first aspect is signal detection of the terminal on the whole system bandwidth and the second aspect is blind detection of the terminal over a PDCCH. Blind detection over the PDCCH includes detection of different control channel element aggregation levels such as 2, 4 and 8, different DCI lengths and the like, and DCL detected by the terminal includes DCI only for a single terminal, which is to be detected in a UE-specific search space, and also includes DCI for multiple terminals, which is to detected in a common search space. Since more contents are detected, the power consumption of the terminal is relatively high. In such a case, DCI for the terminal may also be sent in a PDCCH on the narrow bandwidth.

Herein, the DC is in a terminal-specific search space corresponding to the terminal and at a control channel element aggregation level corresponding to the terminal.

In the narrow-bandwidth receiving mode, the PDCCH configured for the base station to schedule the terminal is on the narrow bandwidth indicated by the base station. For reducing complexity in receiving such a PDCCH by the terminal, DCI for a unique terminal rather than DCI for all terminals on the narrow bandwidth may be contained in the PDCCH on the narrow bandwidth, or the PDCCH on the narrow bandwidth only includes the UE-specific search space and does not include the common search space. Meanwhile, for the DCI for a unique terminal, the control channel element aggregation level is fixed. For example, the control channel element aggregation level may be indicated the terminal when the base station configures the narrow-bandwidth receiving mode for the terminal.

Since the PDCCH only includes the UE-specific search space and the fixed control channel element aggregation level, the amount of information that needs to be detected by the terminal when receiving the PDCCH on the narrow bandwidth may be reduced, and the power consumption of the terminal may further be reduced.

In S202, when CSI of a downlink channel needs to be measured, the base station schedules the terminal to sequentially switch to at least two different measurement narrow bandwidths to measure downlink reference signals.

Herein, each of the at least two different measurement narrow bandwidths is smaller than the system bandwidth.

Each of the narrow bandwidth and the at least two different measurement narrow bandwidths is on a respective frequency band different from one another, and may be partially overlapped or completely independent, and there are no limits made in the disclosure. A sum of the at least two different measurement narrow bandwidths may be the system bandwidth, or may be part of the system bandwidth, and there are also no limits made in the embodiment of the disclosure.

For the terminal in the narrow-bandwidth receiving mode, the base station may instruct the terminal to retune itself at a specified time or periodically to other narrow bandwidths, i.e., measurement narrow bandwidths, at different frequencies to measure the downlink reference signals, and on the measurement narrow bandwidth, the terminal may measure the downlink reference signals in the measurement narrow bandwidth to form narrow-band CSI. The base station may configure the terminal to form the CSI of the downlink channel by use of the narrow-band CSI obtained by measurement and feed it back to the base station. Or, the base station may configure the terminal to directly feed the narrow-band CSI obtained by measurement back to the base station, and then the base station calculates the CSI of the downlink channel according to at least two pieces of narrow-band CSI. A reference is provided for downlink data scheduling of the base station. The power consumption of the terminal and system performance are balanced.

Of course, besides using two or more measurement narrow bandwidths for measurement, only one measurement narrow bandwidth may also be used for measurement. When the two or more measurement narrow bandwidths are used for measurement, a measurement result is relatively high in accuracy.

Figure 3:
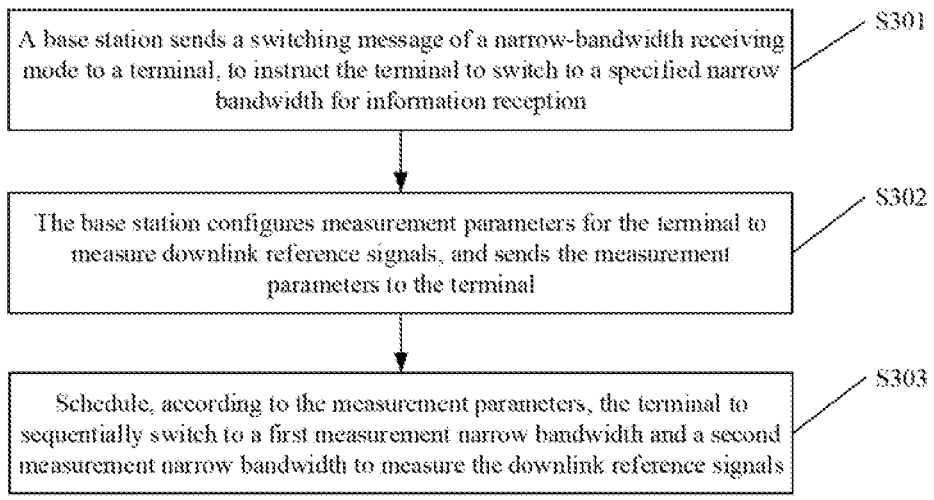
FIG. 3 illustrates a flowchart of a second embodiment of a measurement method according to the disclosure.

FIG. 3 illustrates a flowchart of a second embodiment of a measurement method according to the disclosure. In the embodiment, the method includes the following actions.

In S301, a base station sends a switching message of a narrow-bandwidth receiving mode to a terminal, to instruct the terminal to switch to a specified narrow bandwidth for information reception.

In S302, the base station configures measurement parameters for the terminal to measure downlink reference signals and sends the measurement parameters to the terminal.

Alternatively, the measurement parameters include a period in which the terminal measures the downlink reference signals, first time bucket information for the terminal to measure the downlink reference signals on a first measurement narrow bandwidth in the period and second time bucket information for the terminal to measure the downlink reference signals on a second measurement narrow bandwidth in the period.

Herein, the period includes a duration in which the terminal enters the narrow-bandwidth receiving mode, switches to the first measurement narrow bandwidth to measure the downlink reference signals, switches to the second measurement narrow bandwidth to measure the downlink reference signals, and enters the narrow-bandwidth receiving mode again.

In S303, the terminal is scheduled to sequentially switch to a first measurement narrow bandwidth and a second measurement narrow bandwidth to measure the downlink reference signals according to the measurement parameters.

Figure 4:
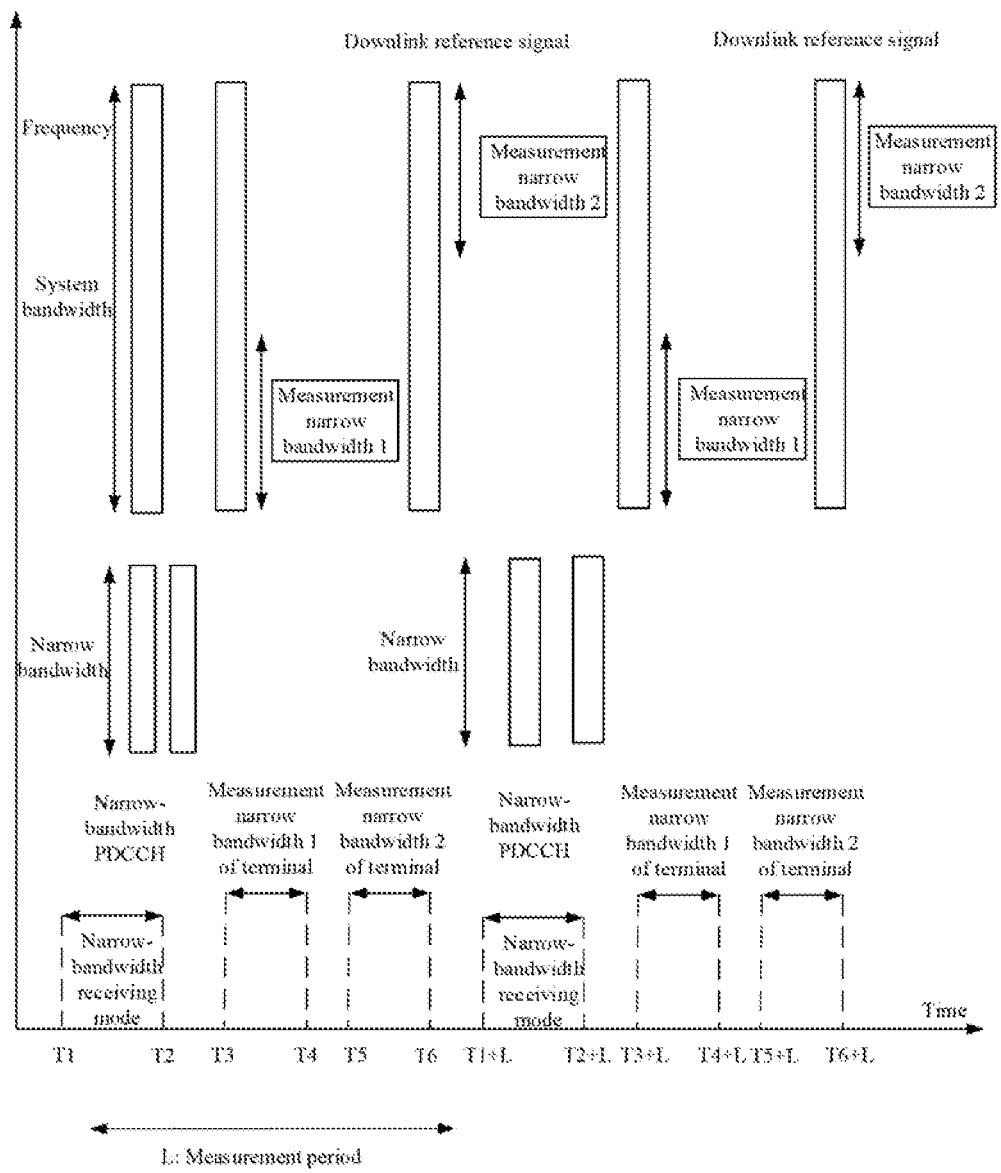
FIG. 4 illustrates a schematic diagram of measuring downlink reference signals by adopting the method illustrated in FIG. 3 according to an embodiment of the disclosure.

FIG. 4 illustrates a schematic diagram of measuring a downlink reference signals by adopting the method illustrated in FIG. 3 according to an embodiment of the disclosure. Herein, the base station may configure the period for measuring the downlink reference signals and time bucket information for measuring the downlink reference signals on each measurement narrow bandwidth in the period. For example, T1~T1+L form a complete period, T3~T4 is a time bucket for measuring the downlink reference signals on a measurement narrow bandwidth 1, and T5~T6 is a time bucket for measuring the downlink reference signals on a measurement narrow bandwidth 2. If L is 14 ms, T3~T4 take a 5th ms to a 6th ms therein and T5~T6 take an 8th ms to an 11th ms therein, in each period, the base station may schedule the terminal to switch to the two measurement narrow bandwidths to measure the downlink reference signals. Of course, the base station may also configure time bucket information for the terminal on the narrow bandwidth. For example, as illustrated in FIG. 4, the base station may pre-configure the terminal to be in the narrow-bandwidth receiving mode in time T1~T2, retune itself to the measurement narrow bandwidth 1 to measure the downlink reference signals in time T3~T4, retune itself to the measurement narrow bandwidth 2 to measure the downlink reference signals in time T5~T6, and return to the narrow-bandwidth receiving mode in time T1+L~T2+L. Herein, time T2~T3 is a time interval reserved for the terminal to retune itself from the narrow bandwidth to the measurement narrow bandwidth 1, the time T5~T6 is a time interval reserved for the terminal to retune itself from the measurement narrow bandwidth 1 to the measurement narrow bandwidth 2, and T6~T1+L is a time period reserved for the terminal to retune itself from the measurement narrow bandwidth 2 back to the narrow bandwidth. L is a length of the whole measurement period. Herein, both of the measurement narrow bandwidth 1 and the measurement narrow bandwidth 2 are on the system bandwidth.

It is to be noted that, for convenience of description, a manner of measurement on two measurement narrow bandwidths is adopted in the embodiment of the disclosure and those skilled in the art should know that, when there are three or more measurement narrow bandwidths, this manner may also be adopted for sequential measurement.

In the embodiment of the disclosure, the specific period and the time bucket information for measuring the downlink reference signals on different measurement narrow bandwidths are configured, so that the terminal may start measuring CSI of a downlink channel according to the period when entering the narrow-bandwidth mode. A signaling overhead of the base station may be reduced. Of course, in another implementation mode, after the base station configures the measurement parameters, the terminal, after entering the narrow-bandwidth receiving mode, may also wait for triggering of the base station rather than immediately performing measurement according to the measurement parameters.

Figure 5:
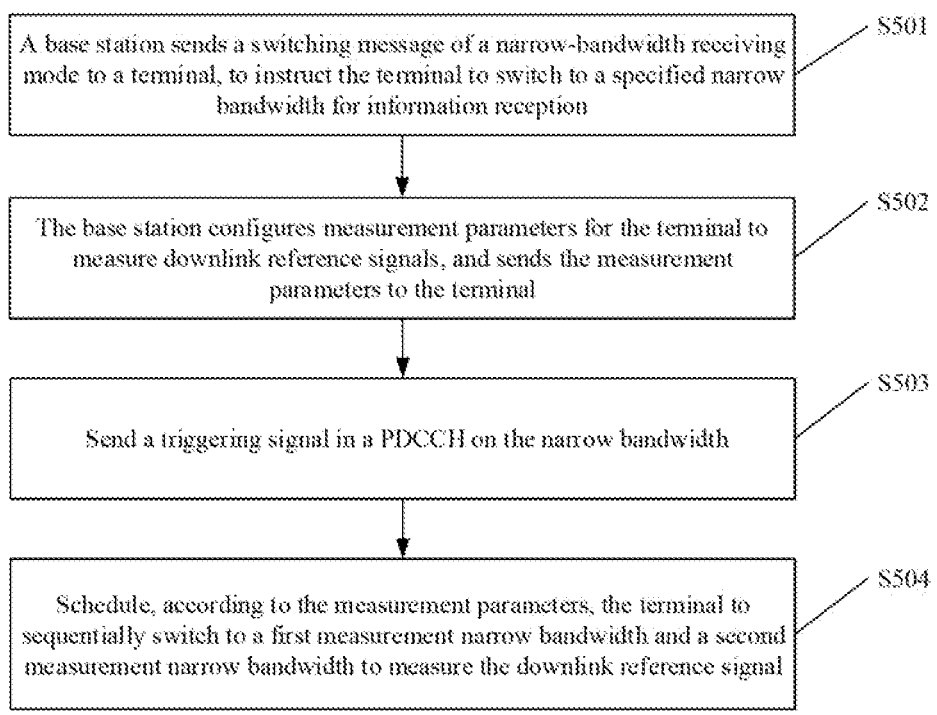
FIG. 5 illustrates a flowchart of a third embodiment of a measurement method according to the disclosure.

FIG. 5 illustrates a flowchart of a third embodiment of a measurement method according to the disclosure. In the embodiment, S501-S502 are the same as S301-S302, S504 is the same as S303, and before S504, the method further includes the following action.

In S503, a triggering signal is sent in a PDCCH on the narrow bandwidth.

The triggering signal is arranged to trigger the terminal to switch to the first measurement narrow bandwidth and the second measurement narrow bandwidth to measure the downlink reference signals according to the measurement parameters.

Alternatively, the base station may trigger the terminal to start measurement by use of a signal in the PDCCH on the narrow bandwidth, for example, a plurality of bits in the DCI, and the terminal does not start measurement in the manner illustrated in FIG. 4 until receiving the triggering signal.

The terminal is scheduled for measurement in a triggering manner, so that flexibility of the base station's scheduling on the terminal for measurement may be improved.

In the embodiments illustrated in FIG. 3-FIG. 5, the measurement parameters configured for the terminal by the base station includes at least two different configurations, and when the measurement parameters are sent to the terminal, configuration patterns of the measurement parameters is indicated the terminal through the PDCCH on the narrow bandwidth.

If the present measurement parameters need to be modified, the base station may instruct the terminal to use another set of configured measurement parameters for measurement through the PDCCH on the narrow bandwidth.

For example, the base station pre-configures three sets of different configured parameters, and the base station triggers the terminal to start measurement according to the first set of configured parameters by use of the PDCCH on the narrow bandwidth at first; and at a future moment, the base station may instruct the terminal to adopt the second set or third set of configured parameters to start measurement by use of the PDCCH on the narrow bandwidth.

Figure 6:
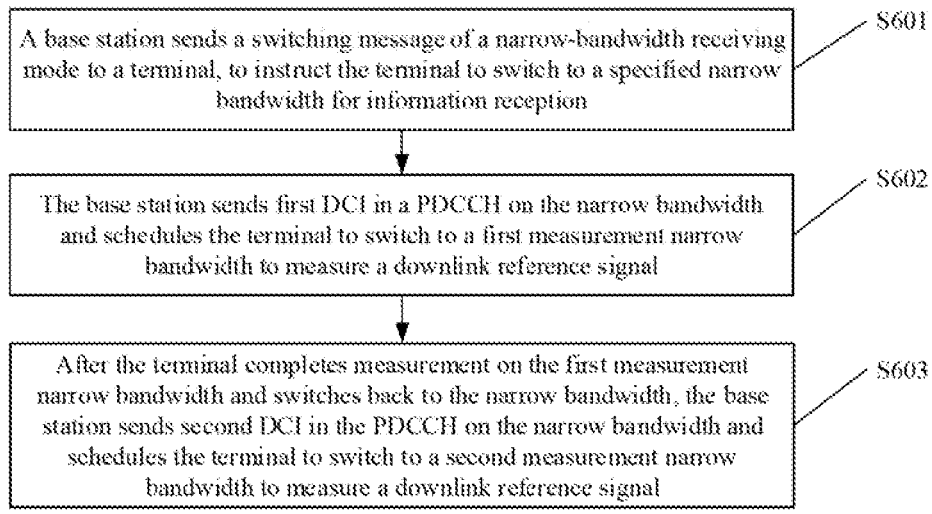
FIG. 6 illustrates a flowchart of a fourth embodiment of a measurement method according to the disclosure.

FIG. 6 illustrates a flowchart of a fourth embodiment of a measurement method according to the disclosure. In the embodiment, the method includes the following actions.

In S601, a base station sends a switching message of a narrow-bandwidth receiving mode to a terminal, to instruct the terminal to switch to a specified narrow bandwidth for information reception.

In S602, the base station sends first DC in a PDCCH on the narrow bandwidth, and schedules the terminal to switch to a first measurement narrow bandwidth to measure downlink reference signals.

Herein, the first DCI includes bandwidth information of the first measurement narrow bandwidth, and starting time and ending time for measurement on the first measurement narrow bandwidth.

In S603, after the terminal completes measurement on the first measurement narrow bandwidth and switches back to the narrow bandwidth, the base station sends second DCI in the PDCCH on the narrow bandwidth, and schedules the terminal to switch to a second measurement narrow bandwidth to measure the downlink reference signals.

Herein, the second DCI includes bandwidth information of the second measurement narrow bandwidth, and starting time and ending time for measurement on the second measurement narrow bandwidth.

Alternatively, for reducing the fields in DC taken by bandwidth information, the base station may configure, for bandwidth information of at least two measurement narrow bandwidths, respective measurement narrow bandwidth indexes, the measurement narrow bandwidth index is to indicate the bandwidth information of the measurement narrow bandwidth, to which the terminal is to switch. The base station may divide a system bandwidth into a plurality of measurement narrow bandwidths, for example, a measurement narrow bandwidth 1 and a measurement narrow bandwidth 2, in advance, and each of the different measurement narrow bandwidths corresponds to a respective measurement narrow bandwidth index different from one another, which is pre-configured for the terminal by the base station through high-layer signaling, for example, RRC signaling, or may be directly pre-stored in the base station and the terminal.

Figure 7:
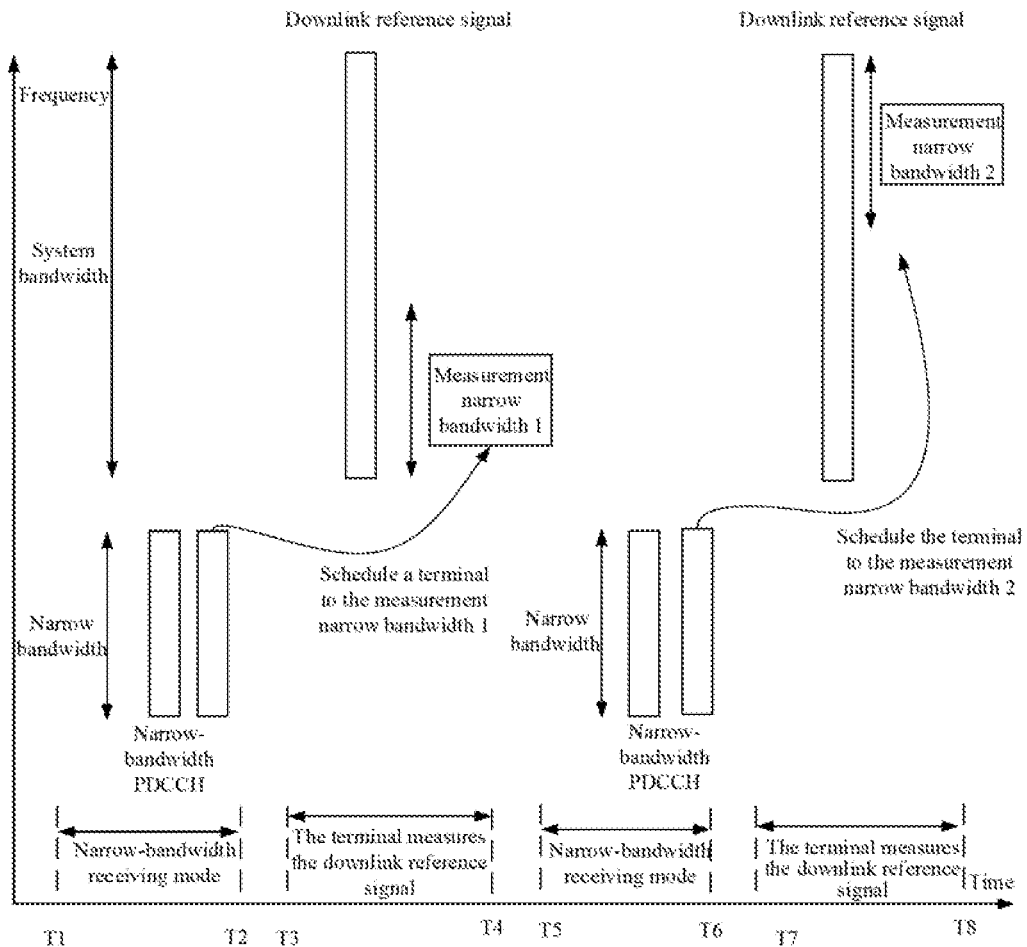
FIG. 7 illustrates a schematic diagram of measuring downlink reference signals by adopting the method illustrated in FIG. 6 according to an embodiment of the disclosure.

A specific measurement process may be seen from FIG. 7 which illustrates a schematic diagram of measuring downlink reference signals by adopting the method illustrated in FIG. 6 according to an embodiment of the disclosure.

The base station schedules the terminal in the narrow-bandwidth receiving mode through the narrow-band PDCCH to retune itself to different measurement narrow bandwidths to measure corresponding narrow-band CSI. For example, the base station may indicate, through DC transmitted in the PDCCH on the narrow bandwidth, the index of the measurement narrow bandwidth where the terminal is intended to perform measurement and starting time and ending time for the measurement. The terminal in the narrow-bandwidth receiving mode, after receiving corresponding scheduling information, retunes itself to the corresponding measurement narrow bandwidth to measure corresponding narrow-band CSI and retunes itself back to the narrow-bandwidth receiving mode after measurement. As illustrated in FIG. 7, the terminal receives a scheduling indication of the base station at time T1~T2, and the terminal measures narrow-band CSI for the measurement narrow bandwidth 1 at time T3~T4. T2~T3 is a time period for the terminal to retune itself from the narrow bandwidth to the measurement narrow bandwidth 1. After measurement on the measurement narrow bandwidth 1 is completed, the terminal receives the scheduling indication of the base station at time T5~T6, and the terminal measures narrow-band CSI for the measurement narrow bandwidth 2 at time T7~T8. T6~T7 is a time period for the terminal to retune itself from the narrow bandwidth to the measurement narrow bandwidth 2.

In the embodiment, the base station schedules the terminal for measurement on different measurement narrow bandwidths in a single triggering manner, so that the measurement flexibility may be improved, and it facilitates the base station to perform flexible configuration according to a present requirement.

Figure 8:
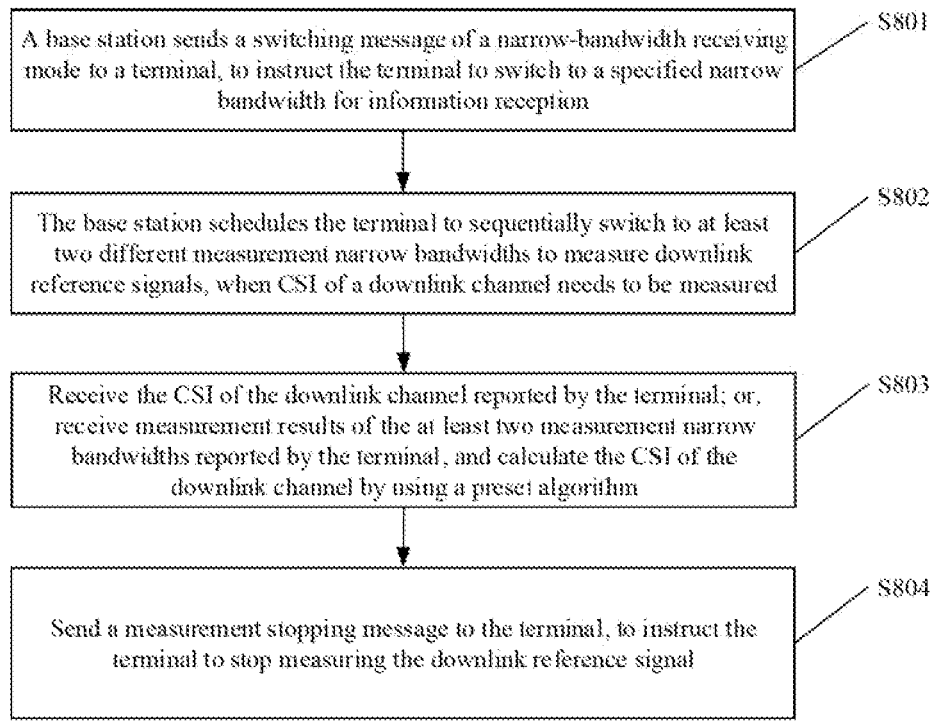
FIG. 8 illustrates a flowchart of a fifth embodiment of a measurement method according to the disclosure.

For obtaining final CSI of a downlink channel, the base station may execute a method in the embodiment illustrated in FIG. 8.

FIG. 8 illustrates a flowchart of a fifth embodiment of a measurement method according to the disclosure. In the embodiment, the measurement method includes the following actions.

In S801, a base station sends a switching message of a narrow-bandwidth receiving mode to a terminal, to instruct the terminal to switch to a specified narrow bandwidth for information reception.

In S802, when CSI of a downlink channel needs to be measured, the base station schedules the terminal to sequentially switch to at least two different measurement narrow bandwidths to measure downlink reference signals.

In S803, the CSI, reported by the terminal, of the downlink channel is received. The CSI of the downlink channel is calculated by the terminal, measurement results of the at least two different measurement narrow bandwidths by using a preset algorithm, or the measurement results, reported by the terminal, of the at least two measurement narrow bandwidths are received and the CSI of the downlink channel is calculated by using the preset algorithm.

Alternatively, the base station may configure the predetermined preset algorithm for the terminal, and the terminal may measure information reference signals on different measurement narrow bandwidths to obtain narrow-band CSI to calculate CSI of a system bandwidth according to a configured calculation method.

The preset algorithm may include, but not limited to, weighted summation, averaging or averaging without extremums.

For example, the base station may allocate different weights for different narrow-band CSI, and the terminal performs weighted summation on narrow-band CSI obtained by measurement to obtain CSI required by the base station. For example, the terminal obtains narrow-band CSI 1 and narrow-band CSI 2 by measurement, the weights pre-allocated by the base station are w1 and w2 respectively, and CSI to be reported to the base station by the terminal is CSI:=w1*CSI1+w2* CSI2. The terminal may also average the CSI 1 and the CSI 2 to obtain CSI=(CSI1+CSI2)/2. When there are more measurement narrow bandwidths, a maximum value and minimum value therein may also be excluded for averaging.

Herein, when CSI of a downlink channel on a system bandwidth is calculated in a weighted summation manner, weight configuration may be performed according to a frequency-domain position and/or width of a measurement narrow bandwidth. For example, a relatively high weight is allocated for a most common frequency-domain position, and a relatively low weight is allocated for a frequency-domain position with a relatively low utilization rate. Or, a relatively high weight is allocated for a relatively large measurement narrow bandwidth, and a relatively low weight is allocated for a relatively small measurement narrow bandwidth. There are no limits made in the embodiment of the disclosure.

The terminal may report a calculation result to the base station, for example, reporting to the base station through Uplink Control Information (UCI) transmitted on a Physical Uplink Control Channel (PUCCH) or a Physical Uplink Shared Channel (PUSCH).

Of course, the terminal, besides reporting the calculated CST of the downlink channel, may also be configured by the base station to directly feed obtained narrow-band CST back to the base station, for example, reporting through the UCI on the PUCCH or the PUSCH. Alternatively, during feeding back through the PUCCH, the base station may allocate different PUCCH resources for different narrow-band CSI (corresponding to different measurement narrow bandwidths). During feeding back through the UCI, the terminal may combine different narrow-band CSI into a set of data for transmission in a predetermined manner, for example, sequentially combining the narrow-band CSI 1, the CSI 2 and the like into a set of data for feeding back to the base station.

The base station, after receiving the narrow-band CSI, may calculate the CSI of the downlink channel on the system bandwidth by using the preset algorithm described above for the terminal side, which will not be elaborated herein.

In S804, a measurement stopping message is sent to the terminal to instruct the terminal to stop measuring the downlink reference signals.

The base station may also trigger the terminal to stop measuring the downlink reference signals through DCI in the PDCCH on the narrow bandwidth. After the base station obtains the CSI, reported by the terminal, of the downlink channel or the reported narrow-band CSI, the base station may temporarily stop the terminal from measuring the downlink reference signals. The base station may also re-trigger the terminal to start measuring the downlink reference signals at a future moment.

It is to be noted that the embodiments of the measurement method illustrated in FIG. 2-FIG. 8 may be independently implemented or may be combined for implementation. For example, the narrow-band CSI may be measured in any manner in FIG. 3-FIG. 7 in the embodiment of FIG. 8. There are no limits made in the embodiment of the disclosure.

Figure 9:
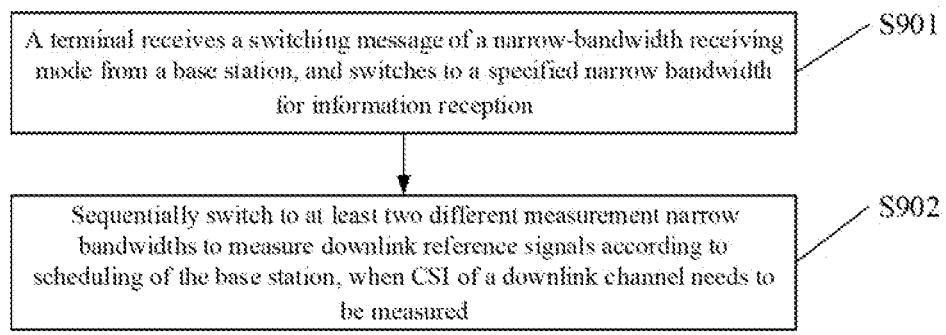
FIG. 9 illustrates a flowchart of a sixth embodiment of a measurement method according to the disclosure.

FIG. 9 illustrates a flowchart of a sixth embodiment of a measurement method according to the disclosure. In the embodiment, the measurement method includes the following actions.

In S901, a terminal receives a switching message of a narrow-bandwidth receiving mode from a base station for switching to a specified narrow bandwidth for information reception.

Herein, the narrow bandwidth is smaller than a system bandwidth. The switching message includes time when the terminal is instructed to enter the narrow-bandwidth receiving mode and a position of the narrow bandwidth on a frequency band when the narrow-bandwidth receiving mode is entered.

Alternatively, the terminal may also receive DCI for the terminal in a PDCCH on the narrow bandwidth.

The DCI is in a terminal-specific search space corresponding to the terminal and at a control channel element aggregation level corresponding to the terminal.

In S902, when CSI of a downlink channel needs to be measured, switching to at least two different measurement narrow bandwidths to measure a downlink reference signals is sequentially executed according to scheduling of the base station.

Herein, each of the at least two different measurement narrow bandwidths is smaller than the system bandwidth.

FIG. 9 illustrates embodiment descriptions made from the terminal side, and a specific process may be seen from embodiment descriptions, illustrated in FIG. 2, made from the base station side and will not be elaborated herein.

Figure 10:
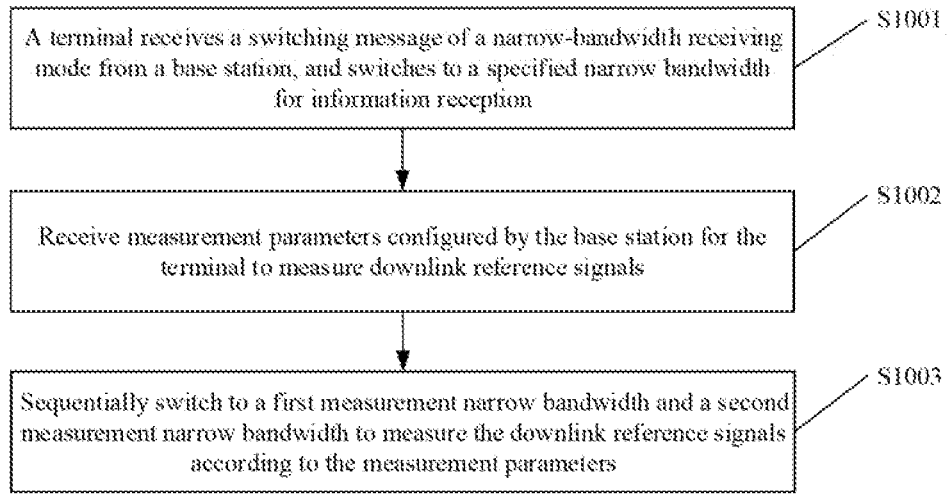
FIG. 10 illustrates a flowchart of a seventh embodiment of a measurement method according to the disclosure.

FIG. 10 illustrates a flowchart of a seventh embodiment of a measurement method according to the disclosure. In the embodiment, the measurement method includes the following actions.

In S1001, a terminal receives a switching message of a narrow-bandwidth receiving mode from a base station for switching to a specified narrow bandwidth for information reception.

In S1002, measurement parameters configured by the base station for the terminal to measure downlink reference signals are received.

The measurement parameters include a period in which the terminal measures the downlink reference signals, first time bucket information for the terminal to measure the downlink reference signals on a first measurement narrow bandwidth in the period and second time bucket information for the terminal to measure the downlink reference signals on a second measurement narrow bandwidth in the period, the measurement parameters is sent to the terminal, and the period includes a duration in which the terminal enters the narrow-bandwidth receiving mode, switches to the first measurement narrow bandwidth to measure the downlink reference signals, switches to the second measurement narrow bandwidth to measure the downlink reference signals, and enters the narrow-bandwidth receiving mode again.

In S1003, switching to a first measurement narrow bandwidth and a second measurement narrow bandwidth to measure the downlink reference signals is sequentially executed according to the measurement parameters.

Alternatively, before the operation of switching to the first measurement narrow bandwidth and the second measurement narrow bandwidth to measure the downlink reference signals is sequentially executed according to the measurement parameters, the method may further include the following operation.

A triggering signal sent by the base station in the PDCCH on the narrow bandwidth is received. The triggering signal is to trigger the terminal to switch to a system bandwidth to measure the downlink reference signals according to the measurement parameters.

Alternatively, in the embodiment illustrated in FIG. 10, the measurement parameters configured for the terminal by the base station may include at least two different configurations, and when the measurement parameters are received, a configuration patterns of the measurement parameters are determined through an indication of a PDCCH on the narrow bandwidth.

If the base station needs to modify the present measurement parameters, information sent by the base station through the PDCCH on the narrow bandwidth and instructing the terminal to use another set of configured measurement parameters for measurement is received.

FIG. 10 illustrates embodiment descriptions made from the terminal side, and a specific process may be seen from embodiment descriptions, illustrated in FIG. 3-FIG. 5, made from the base station side and will not be elaborated herein.

Figure 11:
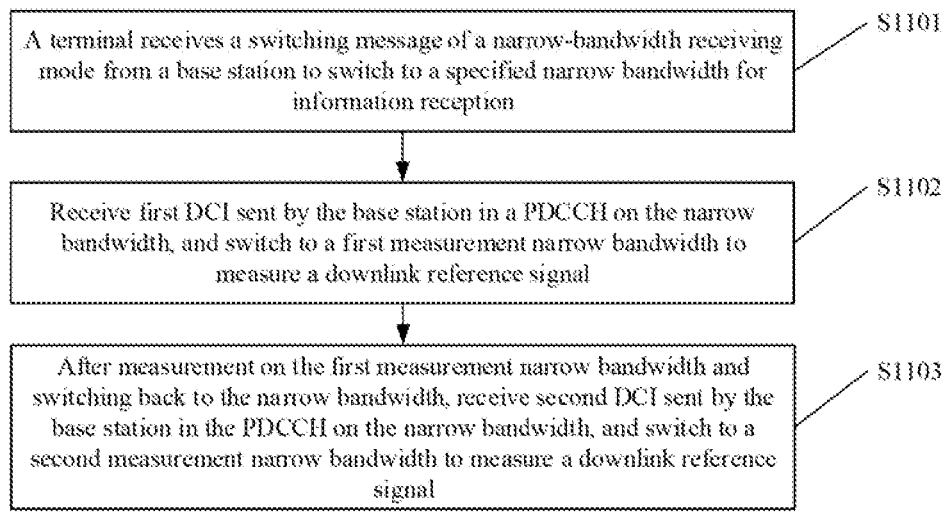
FIG. 11 illustrates a flowchart of an eighth embodiment of a measurement method according to the disclosure.

FIG. 11 illustrates a flowchart of an eighth embodiment of a measurement method according to the disclosure. In the embodiment, the measurement method includes the following actions.

In S1101, a terminal receives a switching message of a narrow-bandwidth receiving mode from a base station for switching to a specified narrow bandwidth for information reception.

In S1102, the terminal receives first DC sent by the base station in a PDCCH on the narrow bandwidth, and switches to a first measurement narrow bandwidth to measure downlink reference signals.

The first DCI includes bandwidth information of the first measurement narrow bandwidth and starting time and ending time for measurement on the first measurement narrow bandwidth.

In S1103, after measurement on the first measurement narrow bandwidth and switching back to the narrow bandwidth, the terminal receives second DCI sent by the base station in the PDCCH on the narrow bandwidth, and switches to a second measurement narrow bandwidth to measure the downlink reference signals.

The second DCI includes bandwidth information of the second measurement narrow bandwidth and starting time and ending time for measurement on the second measurement narrow bandwidth.

Alternatively, in the embodiment illustrated in FIG. 11, the method may further include receiving measurement narrow bandwidth indexes, each configured for bandwidth information of a respective one of at least two measurement narrow bandwidths by the base station. The measurement narrow bandwidth index is to indicate the bandwidth information of the measurement narrow bandwidth, to which the terminal is to switch to.

FIG. 11 illustrates embodiment descriptions made from the terminal side, and a specific process may be seen from embodiment descriptions, illustrated in FIG. 6, made from the base station side and will not be elaborated herein.

Alternatively, in the embodiments illustrated in FIG. 9-FIG. 11, the measurement method may further include the following operations.

The measurement method further includes the following operations.

CSI of a downlink channel is reported to the base station. The CSI of the downlink channel may be obtained by calculating, by the terminal, measurement results of the at least two different measurement narrow bandwidths by using a preset algorithm. Or, the measurement results of the at least two measurement narrow bandwidths may be reported to the base station for the base station to calculate the CSI of the downlink channel by using the preset algorithm.

A measurement stopping message sent by the base station is received, and measurement of the downlink reference signals is stopped.

The preset algorithm may include, but not limited to, weighted summation, averaging or averaging without extremums.

Figure 12:
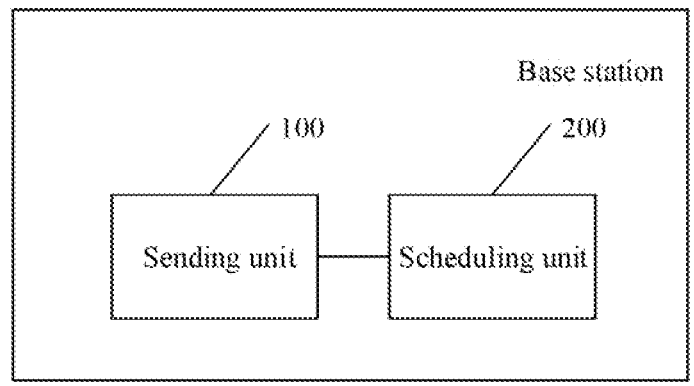
FIG. 12 illustrates a block diagram of a first embodiment of a base station according to the disclosure.

FIG. 12 illustrates a block diagram of a first embodiment of a base station according to the disclosure. In the embodiment, the base station includes a sending unit 100 and a scheduling unit 200.

The sending unit 100 is arranged to send a switching message of a narrow-bandwidth receiving mode to a terminal, to instruct the terminal to switch to a specified narrow bandwidth for information reception.

The scheduling unit 200 is arranged to, when CSI of a downlink channel needs to be measured, schedule the terminal to sequentially switch to at least two different measurement narrow bandwidths to measure downlink reference signals.

Herein, each of the narrow bandwidth and the at least two different measurement narrow bandwidths is smaller than a system bandwidth.

Alternatively, the sending unit 100 is further arranged to send DCI for the terminal in a PDCCH on the narrow bandwidth.

The DCI is in a terminal-specific search space corresponding to the terminal and at a control channel element aggregation level corresponding to the terminal.

Alternatively, if the at least two different measurement narrow bandwidths include a first measurement narrow bandwidth and a second measurement narrow bandwidth, the scheduling unit 200 is arranged to configure measurement parameters for the terminal to measure the downlink reference signals and send the measurement parameters to the terminal. The measurement parameters include a period in which the terminal measures the downlink reference signals, first time information used for the terminal to measure the downlink reference signals on the first measurement narrow bandwidth in the period and second time information used for the terminal to measure the downlink reference signals on the second measurement narrow bandwidth in the period. The period includes a duration in which the terminal enters the narrow-bandwidth receiving mode, switches to the first measurement narrow bandwidth to measure the downlink reference signals, switches to the second measurement narrow bandwidth to measure the downlink reference signals, and enters the narrow-bandwidth receiving mode again.

The scheduling unit 200 is further arranged to schedule the terminal to sequentially switch to the first measurement narrow bandwidth and the second measurement narrow bandwidth to measure the downlink reference signals according to the measurement parameters.

Alternatively, before the terminal is scheduled to sequentially switch to the first measurement narrow bandwidth and the second measurement narrow bandwidth to measure the downlink reference signals according to the measurement parameters, the sending unit 100 is further arranged to send a triggering signal in the PDCCH on the narrow bandwidth. The triggering signal is to trigger the terminal to switch to the first measurement narrow bandwidth and the second measurement narrow bandwidth to measure the downlink reference signals according to the measurement parameters.

Alternatively, the measurement parameters configured for the terminal by the base station includes at least two different configurations, and when the sending unit 100 sends the measurement parameters to the terminal, the scheduling unit 200 is further arranged to indicate the terminal configuration patterns of the measurement parameters through the PDCCH on the narrow bandwidth.

If the present measurement parameters need to be modified, the scheduling unit 200 is further arranged to instruct the terminal to use another set of configured measurement parameters for measurement through the PDCCH on the narrow bandwidth.

Alternatively, if the at least two different measurement narrow bandwidths include the first measurement narrow bandwidth and the second measurement narrow bandwidth, the scheduling unit 200 is arranged to send first DCI in the PDCCH on the narrow bandwidth, and schedule the terminal to switch to the first measurement narrow bandwidth to measure the downlink reference signals. The first DCI includes bandwidth information of the first measurement narrow bandwidth and starting time and ending time for measurement on the first measurement narrow bandwidth.

The scheduling unit 200 is further arranged to, after the terminal completes measurement on the first measurement narrow bandwidth and switches back to the narrow bandwidth, send second DC in the PDCCH on the narrow bandwidth, and schedule the terminal to switch to the second measurement narrow bandwidth to measure the downlink reference signals. The second DCI includes bandwidth information of the second measurement narrow bandwidth and starting time and ending time for measurement on the second measurement narrow bandwidth.

Alternatively, the scheduling unit 200 is further arranged to configure, for bandwidth information of the at least two measurement narrow bandwidths, respective measurement narrow bandwidth indexes. The measurement narrow bandwidth index is to indicate the bandwidth information of the measurement narrow bandwidth, to which the terminal is to switch.

Alternatively, the scheduling unit 200 is further arranged to receive the CSI, reported by the terminal, of the downlink channel, or receive the measurement results, reported by the terminal, of the at least two measurement narrow bandwidths and calculate the CSI of the downlink channel according to the preset algorithm. The CSI of the downlink channel is obtained by calculating, by the terminal, measurement results of the at least two different measurement narrow bandwidths by using a preset algorithm.

The scheduling unit 200 is further arranged to send a measurement stopping message to the terminal, to instruct the terminal to stop measuring the downlink reference signals.

Alternatively, the preset algorithm includes weighted summation, averaging or averaging without extremums.

Figure 13:
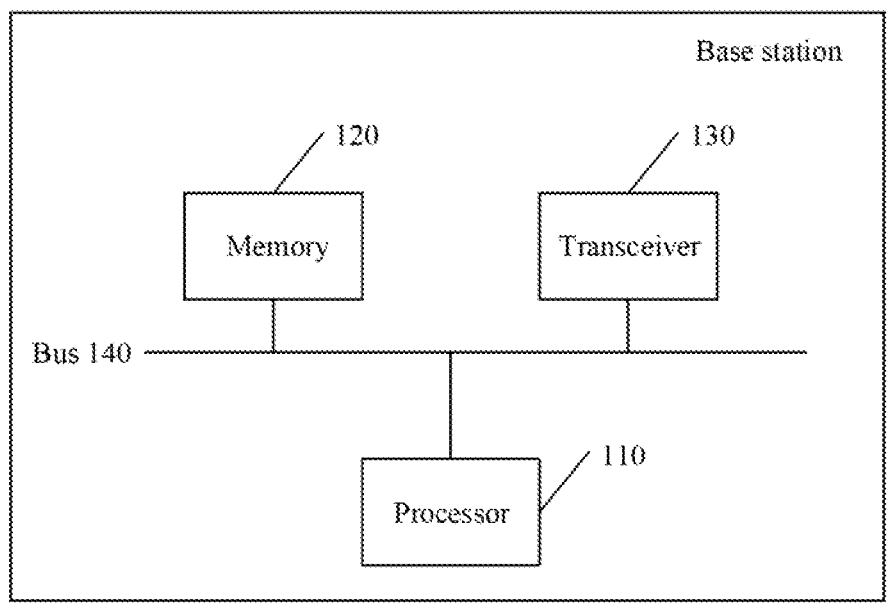
FIG. 13 illustrates a block diagram of a second embodiment of a base station according to the disclosure.

FIG. 13 illustrates a block diagram of a second embodiment of a base station according to the disclosure. In the embodiment, the base station includes a processor 110, a memory 120, a transceiver 130 and a bus 140. The processor 110, the memory 120 and the transceiver 130 are connected through the bus 140. The transceiver 130 is arranged to send and receive signals and communicate with a terminal. The memory 120 is arranged to store a set of program codes. The processor 110 is arranged to call the program codes stored in the memory 120 to execute the following operations.

A switching message of a narrow-bandwidth receiving mode is sent, through the transceiver 130, to the terminal, to instruct the terminal to switch to a specified narrow bandwidth for information reception.

When CSI of a downlink channel needs to be measured, the terminal is scheduled to sequentially switch to at least two different measurement narrow bandwidths to measure downlink reference signals.

Herein, each of the narrow bandwidth and the at least two different measurement narrow bandwidths is smaller than a system bandwidth.

Alternatively, the processor 110 is further arranged to send, through the transceiver 130, DCI for the terminal in a PDCCCH on the narrow bandwidth.

The DCI is in a terminal-specific search space corresponding to the terminal and at a control channel element aggregation level corresponding to the terminal.

Alternatively, if the at least two different measurement narrow bandwidths include a first measurement narrow bandwidth and a second measurement narrow bandwidth, the processor 110 is arranged to configure a measurement parameters configured for the terminal to measure the downlink reference signals, and send, through the transceiver 130, the measurement parameters to the terminal. The measurement parameters include a period in which the terminal measures the downlink reference signals, first time information used for the terminal to measure the downlink reference signals on the first measurement narrow bandwidth in the period, and second time information used for the terminal to measure the downlink reference signals on the second measurement narrow bandwidth in the period. The period includes a duration in which the terminal enters the narrow-bandwidth receiving mode, switches to the first measurement narrow bandwidth to measure the downlink reference signals, and switches to the second measurement narrow bandwidth to measure the downlink reference signals, and enters the narrow-bandwidth receiving mode again; and The processor 110 is further arranged to schedule the terminal to sequentially switch to the first measurement narrow bandwidth and the second measurement narrow bandwidth to measure the downlink reference signals according to the measurement parameters.

Alternatively, before the terminal is scheduled to sequentially switch to the first measurement narrow bandwidth and the second measurement narrow bandwidth to measure the downlink reference signals according to the measurement parameters, the processor 110 is further arranged to send, through the transceiver 130, a triggering signal in the PDCCH on the narrow bandwidth. The triggering signal is to trigger the terminal to switch to the first measurement narrow bandwidth and the second measurement narrow bandwidth to measure the downlink reference signals according to the measurement parameters.

Alternatively, the measurement parameters configured for the terminal by the base station includes at least two different configurations, and the processor 110 is further arranged to, when the measurement parameters are sent to the terminal, indicate the terminal configuration patterns of the measurement parameters through the PDCCH on the narrow bandwidth.

If the present measurement parameters need to be modified, the processor 110 is further arranged to instruct the terminal to use another set of configured measurement parameters for measurement through the PDCCH on the narrow bandwidth.

Alternatively, if the at least two different measurement narrow bandwidths include the first measurement narrow bandwidth and the second measurement narrow bandwidth, the processor 110 is arranged to send first DCI in the PDCCH on the narrow bandwidth, and schedule the terminal to switch to the first measurement narrow bandwidth to measure the downlink reference signals. The first DCI includes bandwidth information of the first measurement narrow bandwidth and starting time and ending time for measurement on the first measurement narrow bandwidth.

The processor 110 is further arranged to, after the terminal completes measurement on the first measurement narrow bandwidth and switches back to the narrow bandwidth, send second DCI in the PDCCH on the narrow bandwidth and schedule the terminal to switch to the second measurement narrow bandwidth to measure the downlink reference signals. The second DCI includes bandwidth information of the second measurement narrow bandwidth, and starting time and ending time for measurement on the second measurement narrow bandwidth.

Alternatively, the processor 110 is further arranged to configure, for bandwidth information of the at least two measurement narrow bandwidths, respective measurement narrow bandwidth indexes. The measurement narrow bandwidth index is to indicate the bandwidth information of the measurement narrow bandwidth, to which the terminal is to switch.

Alternatively, the processor 110 is further arranged to receive, through the transceiver 130, the CSI, reported by the terminal, of the downlink channel, the CSI of the downlink channel being obtained by calculating, by the terminal, measurement results of the at least two different measurement narrow bandwidths by using a preset algorithm, or the processor 110 is further arranged to receive, through the transceiver 130, the measurement results, reported by the terminal, of the at least two measurement narrow bandwidths and calculate the CSI of the downlink channel according to the preset algorithm.

And, the processor 110 is further arranged to send a measurement stopping message to the terminal, to instruct the terminal to stop measuring the downlink reference signals.

Alternatively, the preset algorithm includes weighted summation, averaging or averaging without extremums.

Figure 14:
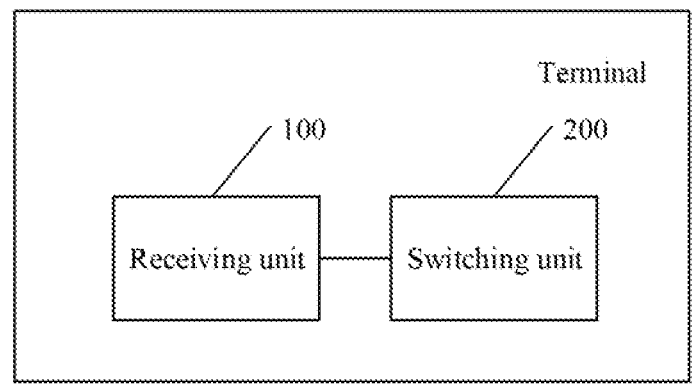
FIG. 14 illustrates a block diagram of a first embodiment of a terminal according to the disclosure.

FIG. 14 illustrates a block diagram of a first embodiment of a terminal according to the disclosure. In the embodiment, the terminal includes a receiving unit 300 and a switching unit 400.

The receiving unit 300 is arranged to receive a switching message of a narrow-bandwidth receiving mode from a base station.

The switching unit 400 is arranged to switch to a specified narrow bandwidth for information reception according to the switching message.

The switching unit 400 is further arranged to, when CSI of a downlink channel needs to be measured, sequentially switch to at least two different measurement narrow bandwidths to measure downlink reference signals according to scheduling of the base station.

Herein, each of the narrow bandwidth and the at least two different measurement narrow bandwidths is smaller than a system bandwidth.

Alternatively, the receiving unit 300 is further arranged to receive DCI for the terminal in a PDCCH on the narrow bandwidth.

The DCI is in a terminal-specific search space corresponding to the terminal and at a control channel element aggregation level corresponding to the terminal. Alternatively, if the at least two different measurement narrow bandwidths include a first measurement narrow bandwidth and a second measurement narrow bandwidth, the receiving unit 300 is arranged to receive measurement parameters configured by the base station for the terminal to measure the downlink reference signals. The measurement parameters include a period in which the terminal measures the downlink reference signals, first time information used for the terminal to measure the downlink reference signals on the first measurement narrow bandwidth in the period, and second time information used for the terminal to measure the downlink reference signals on the second measurement narrow bandwidth in the period. The measurement parameters are sent to the terminal. The period includes a duration in which the terminal enters the narrow-bandwidth receiving mode, switches to the first measurement narrow bandwidth to measure the downlink reference signals, switches to the second measurement narrow bandwidth to measure the downlink reference signals, and enters the narrow-bandwidth receiving mode again.

The switching unit 400 is arranged to sequentially switch to the first measurement narrow bandwidth and the second measurement narrow bandwidth to measure the downlink reference signals according to the measurement parameters.

Alternatively, before the switching unit 400 sequentially switches to the first measurement narrow bandwidth and the second measurement narrow bandwidth to measure the downlink reference signals according to the measurement parameters, the receiving unit 300 is further arranged to receive a triggering signal sent by the base station in the PDCCH on the narrow bandwidth. The triggering signal is to trigger the terminal to switch to a system bandwidth to measure the downlink reference signals according to the measurement parameters.

Alternatively, the measurement parameters configured for the terminal by the base station includes at least two different configurations, and when the measurement parameters is received, the switching unit 400 is further arranged to determine configuration patterns of the measurement parameters through an indication of the PDCCH on the narrow bandwidth.

If the base station needs to modify the present measurement parameters, the receiving unit 300 is further arranged to receive information sent by the base station through the PDCCH on the narrow bandwidth and instructing the terminal to use another set of configured measurement parameters for measurement.

Alternatively, if the at least two different measurement narrow bandwidths include the first measurement narrow bandwidth and the second measurement narrow bandwidth, the receiving unit 300 is arranged to receive first DCI sent by the base station in the PDCCH on the narrow bandwidth. The first DCI includes bandwidth information of the first measurement narrow bandwidth, and starting time and ending time for measurement on the first measurement narrow bandwidth.

The switching unit 400 is arranged to switch to the first measurement narrow bandwidth to measure the downlink reference signals.

After completion of measurement on the first measurement narrow bandwidth and switching back to the narrow bandwidth, the receiving unit 300 is further arranged to receive second DCI sent by the base station in the PDCCH on the narrow bandwidth. The second DCI includes bandwidth information of the second measurement narrow bandwidth, and starting time and ending time for measurement on the second measurement narrow bandwidth. The switching unit 400 is further arranged to switch to the second measurement narrow bandwidth to measure the downlink reference signals.

Alternatively, the receiving unit 300 is further arranged to receive measurement narrow bandwidth indexes, each configured for bandwidth information of a respective one the at least two measurement narrow bandwidths by the base station, the measurement narrow bandwidth index is to indicate the bandwidth information of the measurement narrow bandwidth, to which the terminal is to switch.

Alternatively, the switching unit 400 is further arranged to report the CSI of the downlink channel to the base station, the CSI of the downlink channel being obtained by calculating, by the terminal, measurement results of the at least two different measurement narrow bandwidths by using a preset algorithm, or report the measurement results of the at least two measurement narrow bandwidths to the base station for the base station to calculate the CSI of the downlink channel by using the preset algorithm.

And, the switching unit 400 is further arranged to receive a measurement stopping message sent by the base station and stop measurement of the downlink reference signals.

Alternatively, the preset algorithm includes weighted summation, averaging or averaging without extremums.

Figure 15:
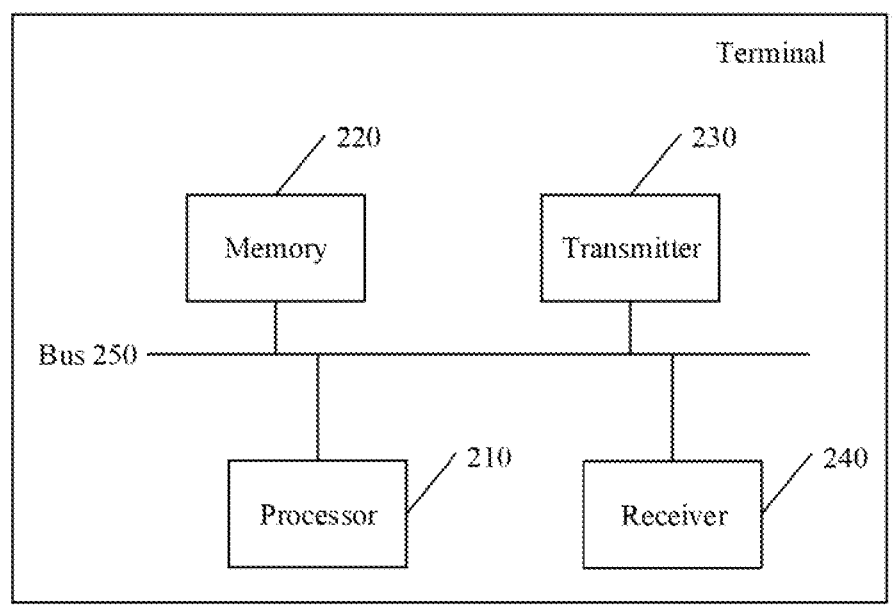
FIG. 15 illustrates a block diagram of a second embodiment of a terminal according to the disclosure.

Referring to FIG. 15, a block diagram of a second embodiment of a terminal according to the disclosure is illustrated. In the embodiment, the terminal includes a processor 210, a memory 220, a transmitter 230, a receiver 240 and a bus 250. The processor 210, the memory 220, the transmitter 230 and the receiver 240 are connected through the bus 250. The transmitter 230 is arranged to transmit a signal. The receiver 240 is arranged to receive the signal. The transmitter 230 and the receiver 240 are independently arranged respectively or integrated. The memory 220 is arranged to store a set of program codes. The processor 210 is arranged to call the program codes stored in the memory 220 to execute the following operations.

A switching message of a narrow-bandwidth receiving mode is received, through the receiver 240, from a base station for switching to a specified narrow bandwidth for information reception.

When CSI of a downlink channel needs to be measured, switching to at least two different measurement narrow bandwidths to measure downlink reference signals is sequentially executed according to scheduling of the base station.

Herein, each of the narrow bandwidth and the at least two different measurement narrow bandwidths is smaller than a system bandwidth.

Alternatively, the processor 210 is further arranged to receive, through the receiver 240, DCI for the terminal in a PDCCH on the narrow bandwidth.

The DCI is in a terminal-specific search space corresponding to the terminal and at a control channel element aggregation level corresponding to the terminal.

Alternatively, if the at least two different measurement narrow bandwidths include a first measurement narrow bandwidth and a second measurement narrow bandwidth, the processor 210 is arranged to receive, through the receiver 240, a measurement parameters configured by the base station for the terminal to measure the downlink reference signals. The measurement parameters include a period in which the terminal measures the downlink reference signals, first time information used for the terminal to measure the downlink reference signals on the first measurement narrow bandwidth in the period, and second time information used for the terminal to measure the downlink reference signals on the second measurement narrow bandwidth in the period. The measurement parameters are sent to the terminal. The period includes a duration in which the terminal enters the narrow-bandwidth receiving mode, switches to the first measurement narrow bandwidth to measure the downlink reference signals, switches to the second measurement narrow bandwidth to measure the downlink reference signals, and enters the narrow-bandwidth receiving mode again.

The processor 210 is further arranged to sequentially switch to the first measurement narrow bandwidth and the second measurement narrow bandwidth to measure the downlink reference signals according to the measurement parameters.

Alternatively, the processor 210 is further arranged to, before sequentially switching to the first measurement narrow bandwidth and the second measurement narrow bandwidth to measure the downlink reference signals according to the measurement parameters, receive, through the receiver 240, a triggering signal sent by the base station in the PDCCH on the narrow bandwidth. The triggering signal is to trigger the terminal to switch to the system bandwidth to measure the downlink reference signals according to the measurement parameters.

Alternatively, the measurement parameters configured for the terminal by the base station include at least two different configurations, and when the measurement parameters are received, the processor 210 is further arranged to determine configuration patterns of the measurement parameters through an indication of the PDCCH on the narrow bandwidth.

And, if the base station needs to modify the present measurement parameters, the processor 210 is further arranged to receive, through the receiver 240, information sent by the base station through the PDCCH on the narrow bandwidth and instructing the terminal to use another set of configured measurement parameters for measurement.

Alternatively, if the at least two different measurement narrow bandwidths include the first measurement narrow bandwidth and the second measurement narrow bandwidth, the processor 210 is arranged to receive, through the receiver 240, first DCI sent by the base station in the PDCCH on the narrow bandwidth, and switch the terminal to the first measurement narrow bandwidth to measure the downlink reference signals. The first DCI includes bandwidth information of the first measurement narrow bandwidth, and starting time and ending time for measurement on the first measurement narrow bandwidth.

After completion of measurement on the first measurement narrow bandwidth and switching back to the narrow bandwidth, the processor 210 is further arranged to receive, through the receiver 240, second DCI sent by the base station in the PDCCH on the narrow bandwidth, and switch the terminal to the second measurement narrow bandwidth to measure the downlink reference signals. The second DC includes bandwidth information of the second measurement narrow bandwidth, and starting time and ending time for measurement on the second measurement narrow bandwidth.

Alternatively, the processor 210 is further arranged to receive measurement narrow bandwidth indexes, each configured for bandwidth information of a respective one of the at least two measurement narrow bandwidths by the base station. The measurement narrow bandwidth index is to indicate the bandwidth information of the measurement narrow bandwidth, to which the terminal is to switch.

Alternatively, the processor 210 is further arranged to report, through the transmitter 230, the CSI of the downlink channel to the base station, the CSI of the downlink channel being obtained by calculating, by the terminal, measurement results of the at least two different measurement narrow bandwidths by using a preset algorithm, or report the measurement results of the at least two measurement narrow bandwidths to the base station for the base station to calculate the CSI of the downlink channel according to the preset algorithm.

And, the processor 210 is further arranged to receive, through the receiver 240, a measurement stopping message sent by the base station and stop measuring the downlink reference signals.

Alternatively, the preset algorithm includes weighted summation, averaging or averaging without extremums.

The base station introduced in the embodiment may be arranged to implement part or all of flows in the method embodiments introduced in the disclosure in combination with FIG. 2-FIG. 6 and execute part or all of functions in the device embodiment introduced in the disclosure in combination with FIG. 10. The terminal introduced in the embodiment may be arranged to implement part or all of flows in the method embodiments introduced in the disclosure in combination with FIG. 7-FIG. 9 and execute part or all of functions in the device embodiment introduced in the disclosure in combination with FIG. 12. Elaborations are omitted herein.

In a cellular system, a terminal measures and compares signal quality of different cells to select a best cell, and this process is called mobility management. In an LTE system, mobility management is completed through a CRS or a CSI-RS. In a 5G (New Radio (NR)) system under discussion, a terminal may measure a synchronization signal (SS) block for mobility management. A multi-beam system in the 5G (NR) system covers the whole cell through different beams, that is, each beam covers a relatively small range, and an effect of covering the whole cell by use of multiple beams is achieved by time sweeping. A base station may transmit different SS blocks on different beams, and UE may distinguish different beams through different SS blocks.

In the NR system, an SS block at least includes, but not limited to, the following contents:
  a Primary Synchronization Signal (PSS);
  a Secondary Synchronization Signal (SSS); and
  a Physical Broadcast Channel (PBCH).

There is made such a hypothesis that a system includes 4 beams, and on each beam, a different SS block is sent, that is, an SS block #i (i=1,2,3,4) is sent on a beam i. Multiple SS blocks in a period of IOms are combined into an SS burst set. From the following figure, it can be seen that a UE in the same cell may need to detect multiple SS blocks (within 10 ms). In case of a single-beam system, one SS block may be detected. In the SS block, the PSS and the SSS are separated in the time domain, namely in a time division multiplexing manner, and the PBCH and the SSs also adopt the time division multiplexing manner. A possible manner may be PSS-SSS-PBCH, or may be PSS-PBCH-SSS, or may be PSS-SSS-PBCH-SSS.

When a terminal is arranged to receive information on a narrow bandwidth, particularly when the terminal is to measure an SS block for mobility management, a method is needed by the terminal to measure the SS block. Measurement of an SS block on a narrow bandwidth will be described below in combination with specific embodiments in detail. For convenience of description, SS blocks in the following embodiments are called collectively as downlink SSs.

Figure 16:
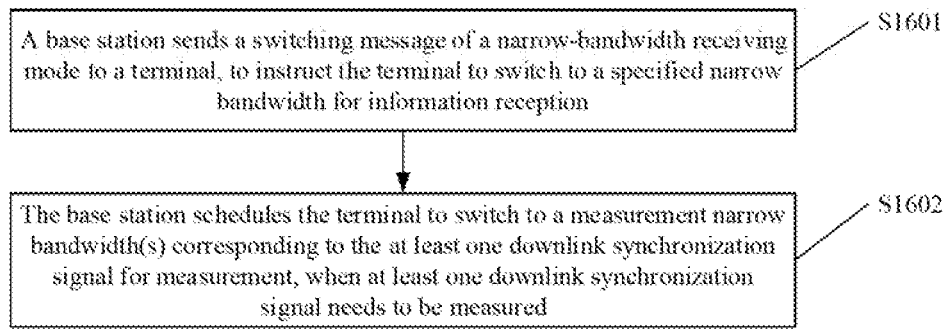
FIG. 16 illustrates a flowchart of a ninth embodiment of a measurement method according to the disclosure.

FIG. 16 illustrates a flowchart of a ninth embodiment of a measurement method according to the disclosure is illustrated. In the embodiment, the measurement method includes the following actions.

In S1601, a base station sends a switching message of a narrow-bandwidth receiving mode to a terminal, to instruct the terminal to switch to a specified narrow bandwidth for information reception.

Herein, the narrow bandwidth is smaller than a system bandwidth. The switching message may include time when the terminal is instructed to enter the narrow-bandwidth receiving mode and a position of the narrow bandwidth on a frequency band when the narrow-bandwidth receiving mode is entered.

Alternatively, the time of being in the narrow-bandwidth receiving mode may include starting time of being the narrow-bandwidth receiving mode. The terminal, after receiving the switching message, enters the narrow-bandwidth receiving mode at the specified starting time and switches to the system bandwidth when receiving a message of stopping the narrow-bandwidth receiving mode from the base station, or may switch from the present narrow bandwidth to another narrow bandwidth or the system bandwidth when receiving a message of switching to the other narrow bandwidth or the system bandwidth from the base station.

The time of being in the narrow-bandwidth receiving mode may further include termination time of being in the narrow-bandwidth receiving mode, besides the starting time of being in the narrow-bandwidth receiving mode. The terminal may enter the narrow-bandwidth receiving mode at the specified starting time and switches back to the system bandwidth for information reception at the specified termination time.

Alternatively, the base station may instruct the terminal to switch to a mode of receiving merely on the narrow bandwidth through high-layer signaling such as RRC or physical-layer signaling such as DCI. The base station may indicate a specific moment when the narrow-bandwidth receiving mode of the terminal is started and a specific position of the narrow bandwidth on the frequency band. Then, the terminal may switch to a specified narrow bandwidth for information reception according to the switching message. In the narrow-bandwidth receiving mode, the terminal may retune its own radio frequency bandwidth to a receiving frequency-domain width, i.e., the specified narrow bandwidth, indicated by a system for the terminal. For example, if the base station indicates that the narrow bandwidth of the terminal is 6 PRBs (for example, 1.4 MHz in case of a 15 KHz subcarrier spacing), the ternninal may retune its own radio frequency unit to 6 PRBs at a frequency band position of the narrow bandwidth indicated by the system. In such a case, the terminal may receive signals on the 6 PRBs. Since decrease of the receiving radio frequency bandwidth, the power consumption of the terminal may be reduced. The terminal does not need to detect the signals on the relatively large system bandwidth, and merely needs to receive the signals and detect the signals on the narrow bandwidth smaller than the system bandwidth, so that a workload of the terminal is reduced, the power consumption of the terminal is reduced and signal receiving efficiency of the terminal is improved.

It is to be noted that a terminal supporting MTC may demodulate a downlink signal on a bandwidth of 1.4 MHz, i.e., 6 PRBs. For such a terminal, power consumption of the terminal may be reduced because of decrease of a downlink bandwidth. However, such a terminal may only work on a relatively narrow bandwidth, for example, 6 PRBs, and thus functions of the terminal may be restricted to a large extent. The narrow bandwidth the embodiment of the disclosure is smaller than the system bandwidth, that is, the narrow bandwidth in the embodiment of the disclosure is a frequency-domain width smaller than the system bandwidth. This is a concept different from the 1.4 MHz bandwidth in an existing 4G system. For example, 10 MHz and 20 MHz are relatively typical system bandwidth in the existing 4G system, and when the system bandwidth is 10 MHz, the narrow bandwidth in the embodiment of the disclosure may be a bandwidth smaller than 10 MHz, for example, 2 MHz and 5 MHz; and when the system bandwidth is 20 MHz, the narrow bandwidth in the embodiment of the disclosure may be a bandwidth smaller than 20 MHz, for example, 5 MHz, 10 MHz and 12 MHz. When the system bandwidth is 1.4 MHz, the narrow bandwidth in the embodiment of the disclosure may also be a bandwidth smaller than 1.4 MHz, for example, 0.6 MHz. For the 5G system with a larger bandwidth, the narrow bandwidth may also be a bandwidth smaller than the system bandwidth in the 5G system.

In S1602, when at least one downlink synchronization signal needs to be measured, the base station schedules the terminal to switch to a measurement narrow bandwidth corresponding to the at least one downlink synchronization signal for measurement.

Herein, each of the narrow bandwidth and the measurement narrow bandwidth is smaller than a system bandwidth.

The narrow bandwidth and the measurement narrow bandwidth are on different frequency bands respectively, and may be partially overlapped or completely independent. There are no limits made in the disclosure.

For the terminal in the narrow-bandwidth receiving mode, the base station may instruct the terminal to retune itself at specified time or periodically to a frequency position corresponding to the downlink synchronization signal. i.e., the measurement narrow bandwidth to measure the downlink synchronization signal.

It is to be noted that the manner of the embodiment may be adopted according to a practical requirement to measure one downlink synchronization signal, or may be adopted to measure two downlink synchronization signals or more than two downlink synchronization signals, and there are no limits made in the embodiment of the disclosure.

Descriptions will be made below with measurement of two downlink synchronization signals as an example. Three or more downlink synchronization signals may be similarly measured.

Figure 17:
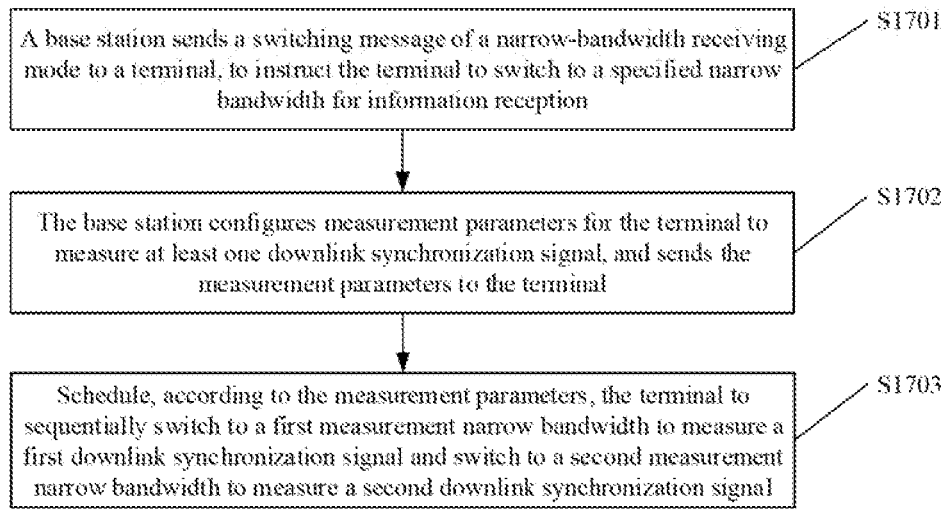
FIG. 17 illustrates a flowchart of a tenth embodiment of a measurement method according to the disclosure.

FIG. 17 illustrates a flowchart of a tenth embodiment of a measurement method according to the disclosure. In the embodiment, a first downlink synchronization signal and a second downlink synchronization signal at different frequencies are to be measured, the first downlink synchronization signal corresponds to a first measurement narrow bandwidth, and the second downlink synchronization signal corresponds to a second measurement narrow bandwidth. The method includes the following actions.

In S1701, a base station sends a switching message of a narrow-bandwidth receiving mode to a terminal, to instruct the terminal to switch to a specified narrow bandwidth for information reception.

In S1702, the base station configures measurement parameters for the terminal to measure at least one downlink synchronization signal and sends the measurement parameters to the terminal.

Alternatively, the measurement parameters include a period in which the terminal measures the downlink synchronization signal, first time information used for the terminal to measure the downlink synchronization signal on the first measurement narrow bandwidth in the period, and second time information used for the terminal to measure the downlink synchronization signal on the second measurement narrow bandwidth in the period.

Herein, the period includes a duration in which the terminal enters the narrow-bandwidth receiving mode, switches to the first measurement narrow bandwidth to measure the first downlink synchronization signal, switches to the second measurement narrow bandwidth to measure the second downlink synchronization signal, and enters the narrow-bandwidth receiving mode again.

In S1703, the terminal is scheduled to sequentially switch to the first measurement narrow bandwidth to measure the first downlink synchronization signal and switch to the second measurement narrow bandwidth to measure the second downlink synchronization signal according to the measurement parameters.

Figure 18:
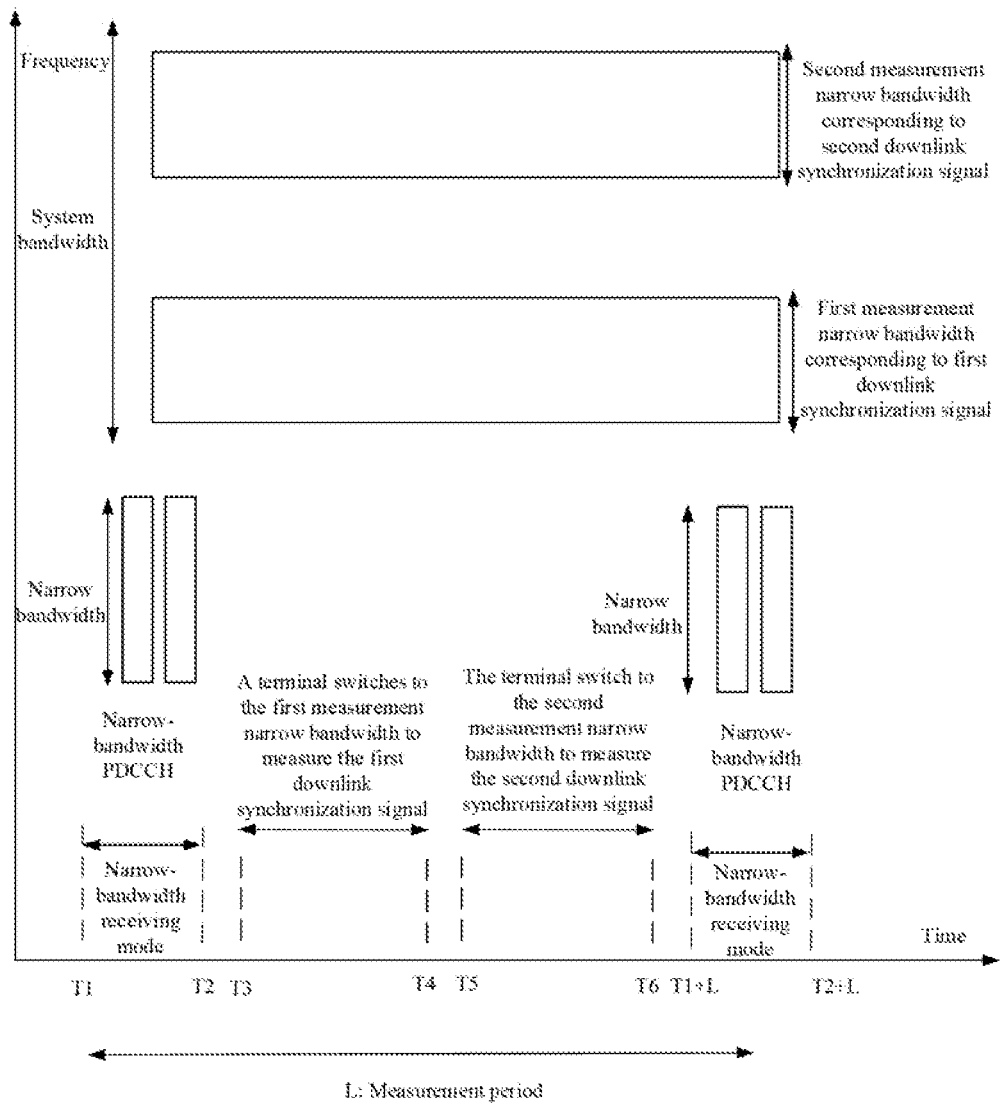
FIG. 18 illustrates a schematic diagram of measuring a downlink synchronization signal by adopting the method illustrated in FIG. 17 according to an embodiment of the disclosure.

FIG. 18 illustrates a schematic diagram of measuring a downlink synchronization signal by adopting the method illustrated in FIG. 17 according to an embodiment of the disclosure. Herein, the base station may configure the period for measuring the downlink synchronization signal and information of a time bucket for measuring the corresponding downlink synchronization signal on each measurement narrow bandwidth in the period. For example, T1~T1+L form a complete period, T3~T4 is a time bucket for measuring the first downlink synchronization signal on the first measurement narrow bandwidth, and T5~T6 is a time bucket for measuring the second downlink synchronization signal on the second measurement narrow bandwidth. If L is 14 ms, T3~T4 takes a 5th ms to a 6th ms therein and T5~T6 takes an 8th ms to an 11th ms therein, in each period, the base station may schedule the terminal to switch to the two measurement narrow bandwidths to measure the respective downlink synchronization signals. Of course, the base station may also configure the information of the time bucket for the terminal on the narrow bandwidth. For example, as illustrated in FIG. 18, the base station may pre-configure that the terminal is in the narrow-bandwidth receiving mode in time T1~T2, retune itself to the first measurement narrow bandwidth to measure the first downlink synchronization signal in time T3~T4, retune itself to the second measurement narrow bandwidth to measure the second downlink synchronization signal in time T5~T6, and return to the narrow-bandwidth receiving mode in time T1+L~T2+L. Herein, time T2~T3 is a time interval reserved for the terminal to retune itself from the narrow bandwidth to the first measurement narrow bandwidth, the time T5~T6 is a time interval reserved for the terminal to retune itself from the first measurement narrow bandwidth to the second measurement narrow bandwidth, and T6~T1+L is a time period reserved for the terminal to retune itself from the second measurement narrow bandwidth back to the narrow bandwidth. L is a length of the whole measurement period. Herein, each of the first measurement narrow bandwidth and the second measurement narrow bandwidth is on a system bandwidth.

It is to be noted that, for convenience of description, a manner of measurement on the two measurement narrow bandwidths is adopted in the embodiment of the disclosure, and those skilled in the art should know that, when there are three or more measurement narrow bandwidths, this manner may also be adopted for sequential measurement.

In the embodiment of the disclosure, the specific period and the information of the time bucket for measuring the corresponding downlink synchronization signals on different measurement narrow bandwidths are configured, so that the terminal may start measuring the downlink synchronization signal according to the period, when entering the narrow-bandwidth mode. A signaling overhead of the base station may be reduced. Of course, in another implementation mode, after the base station configures the measurement parameters, the terminal, after entering the narrow-bandwidth receiving mode, may also wait for triggering of the base station rather than immediately performing measurement according to the measurement parameters.

That is, before S1703, the method may further include the following action.

A triggering signal is sent in a PDCCH on the narrow bandwidth.

The triggering signal is to trigger the terminal to sequentially switch to the first measurement narrow bandwidth to measure the first downlink synchronization signal and switch to the second measurement narrow bandwidth to measure the second downlink synchronization signal according to the measurement parameters.

Alternatively, the base station may trigger the terminal to start measurement by use of a signal in the PDCCH on the narrow bandwidth, for example, a plurality of bits in the DCI, and the terminal starts measurement in the manner illustrated in FIG. 18 only after receiving the triggering signal.

The terminal is scheduled for measurement in a triggering manner, so that flexibility of the base station on the terminal for measurement may be improved.

In the embodiments illustrated in FIG. 17-FIG. 18, the measurement parameters configured for the terminal by the base station includes at least two different configurations, and when the measurement parameters are sent to the terminal, configuration patterns of the measurement parameters is indicated the terminal through the PDCCH on the narrow bandwidth.

If the present measurement parameters need to be modified, the base station may instruct the terminal to use another set of configured measurement parameters for measurement through the PDCCH on the narrow bandwidth.

For example, the base station pre-configures three sets of different configured parameters, and the base station triggers the terminal to start measurement according to the first set of configured parameters by use of the PDCCH on the narrow bandwidth at first; and at a future moment, the base station may instruct the terminal to adopt the second set or third set of configured parameters to start measurement by use of the PDCCH on the narrow bandwidth.

Figure 19:
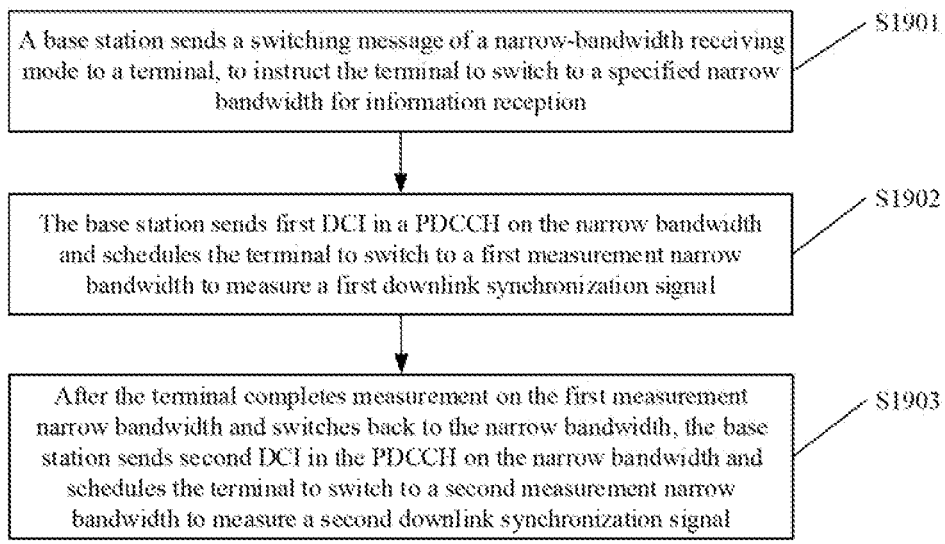
FIG. 19 illustrates a flowchart of an eleventh embodiment of a measurement method according to the disclosure.

FIG. 19 illustrates a flowchart of an eleventh embodiment of a measurement method according to the disclosure. In the embodiment, a first downlink synchronization signal and a second downlink synchronization signal at different frequencies are to be measured, the first downlink synchronization signal corresponds to a first measurement narrow bandwidth, and the second downlink synchronization signal corresponds to a second measurement narrow bandwidth. Then, switching to the measurement narrow bandwidth corresponding to the downlink synchronization signal for measurement is executed according to scheduling of the base station. The method includes the following actions.

In S1901, the base station sends a switching message of a narrow-bandwidth receiving mode to a terminal, to instruct the terminal to switch to a specified narrow bandwidth for information reception.

In S1902, the base station sends first DC in a PDCCH on the narrow bandwidth, and schedules the terminal to switch to the first measurement narrow bandwidth to measure the first downlink synchronization signal.

Herein, the first DCI includes bandwidth information of the first measurement narrow bandwidth, and starting time and ending time for measurement on the first measurement narrow bandwidth.

In S1903, after the terminal completes measurement on the first measurement narrow bandwidth and switches back to the narrow bandwidth, the base station sends second DCI in the PDCCH on the narrow bandwidth, and schedules the terminal to switch to the second measurement narrow bandwidth to measure the second downlink synchronization signal.

Herein, the second DCI includes bandwidth information of the second measurement narrow bandwidth, and starting time and ending time for measurement on the second measurement narrow bandwidth.

Alternatively, for reducing fields taken by the bandwidth information in the DCI, the base station may configure a measurement narrow bandwidth index for the information of a respective one of the first measurement narrow bandwidth and the second measurement narrow bandwidth, the measurement narrow bandwidth index is to indicate the bandwidth information of the measurement narrow bandwidth, to which the terminal is to switch. The base station may pre-configure different indexes corresponding to the downlink synchronization signals to be measured at different frequencies, i.e., bandwidths. Herein, the downlink synchronization signals at different frequencies may be downlink synchronization signals of the same cell at different frequencies, or may be downlink synchronization signals of different cells at different frequencies, and each of the different frequencies corresponds to a respective one of different measurement narrow bandwidth indexes, which is pre-configured for the terminal by the base station through high-layer signaling, for example, RRC signaling, or may be directly pre-stored in the base station and the terminal.

Figure 20:
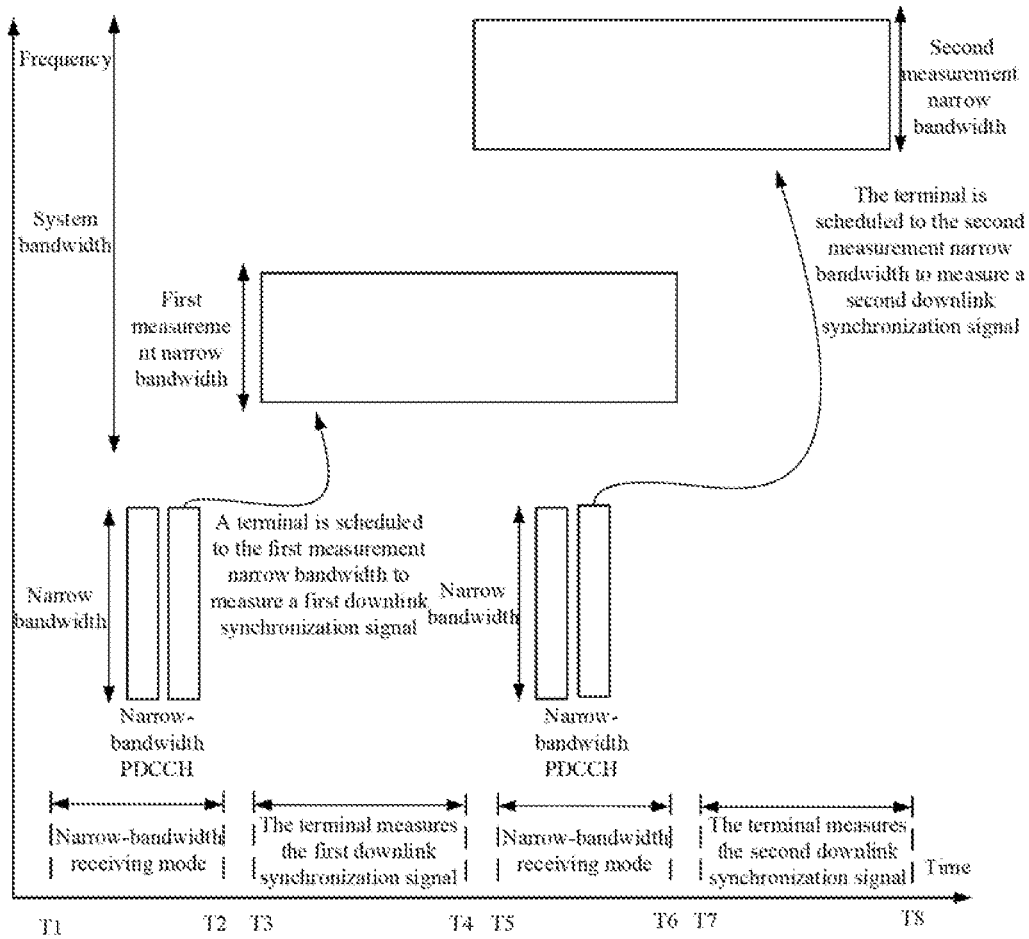
FIG. 20 illustrates a schematic diagram of measuring a downlink synchronization signal by adopting the method illustrated in FIG. 19 according to an embodiment of the disclosure.

A specific measurement process may be seen from FIG. 20 which illustrates a schematic diagram of measuring a downlink synchronization signal by adopting the method illustrated in FIG. 19 according to an embodiment of the disclosure.

The base station schedules the terminal in the narrow-bandwidth receiving mode through the narrow-band PDCCH to retune the terminal to different measurement narrow bandwidths to measure corresponding downlink synchronization signals. For example, the base station may indicate the index of the measurement narrow bandwidth where the terminal is intended to perform measurement and starting time and ending time for measurement through DCI transmitted in the PDCCH on the narrow bandwidth. The terminal in the narrow-bandwidth receiving mode, after receiving corresponding scheduling information, retunes itself to the corresponding measurement narrow bandwidth to measure the corresponding downlink synchronization signal and retunes itself back to the narrow-bandwidth receiving mode after measurement. As illustrated in FIG. 20, the terminal receives a scheduling indication of the base station at time T1~T2, and the terminal measures the first downlink synchronization signal for the first measurement narrow bandwidth at time T3~T4. T2~T3 is a time period for the terminal to retune itself from the narrow bandwidth to the first measurement narrow bandwidth. After measurement on the first measurement narrow bandwidth is completed, the terminal receives the scheduling indication of the base station at time T5~T6, and the terminal measures the second downlink synchronization signal for the second measurement narrow bandwidth at time T7~T8. T6~T7 is a time period for the terminal to retune itself from the narrow bandwidth to the second measurement narrow bandwidth.

In the embodiment, the base station schedules the terminal for measurement on different measurement narrow bandwidths in a single triggering manner, so that the measurement flexibility may be improved, and it facilitates the base station to perform configuration flexibly according to a present requirement.

Alternatively, after measurement is completed, the base station may send a measurement stopping message to the terminal, to instruct the terminal to stop measuring the downlink synchronization signal.

The base station may also trigger the terminal to stop measuring the downlink synchronization signal through DCI in the PDCCH on the narrow bandwidth. After the base station obtains a downlink synchronization signal measurement result reported by the terminal, the base station may temporarily stop the terminal from measuring the downlink synchronization signal. The base station may also re-trigger the terminal to start measuring the downlink synchronization signal at a future moment.

Figure 21:
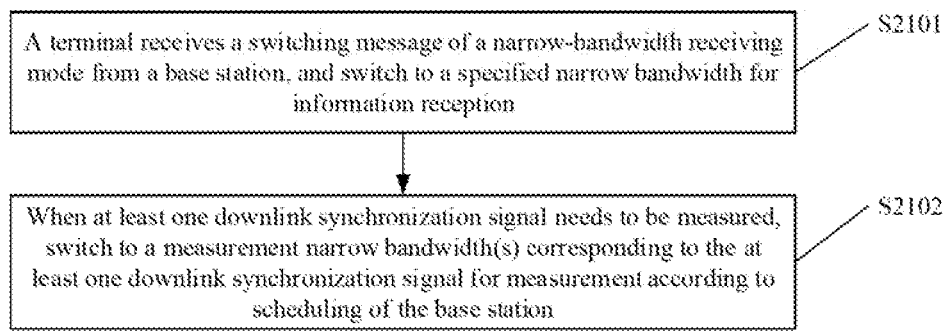
FIG. 21 illustrates a flowchart of a twelfth embodiment of a measurement method according to the disclosure.

FIG. 21 illustrates a flowchart of a twelfth embodiment of a measurement method according to the disclosure. In the embodiment, the measurement method includes the following actions.

In S2101, a terminal receives a switching message of a narrow-bandwidth receiving mode from a base station for switching to a specified narrow bandwidth for information reception.

In S2102, when at least one downlink synchronization signal needs to be measured, switching to a measurement narrow bandwidth corresponding to the at least one downlink synchronization signal for measurement is executed according to scheduling of the base station.

Herein, each of the narrow bandwidth and the measurement narrow bandwidth is smaller than a system bandwidth.

FIG. 21 illustrates embodiment descriptions made from the terminal side, and a specific process may be seen from embodiment descriptions, illustrated in FIG. 16, made from the base station side and will not be elaborated herein.

Figure 22:
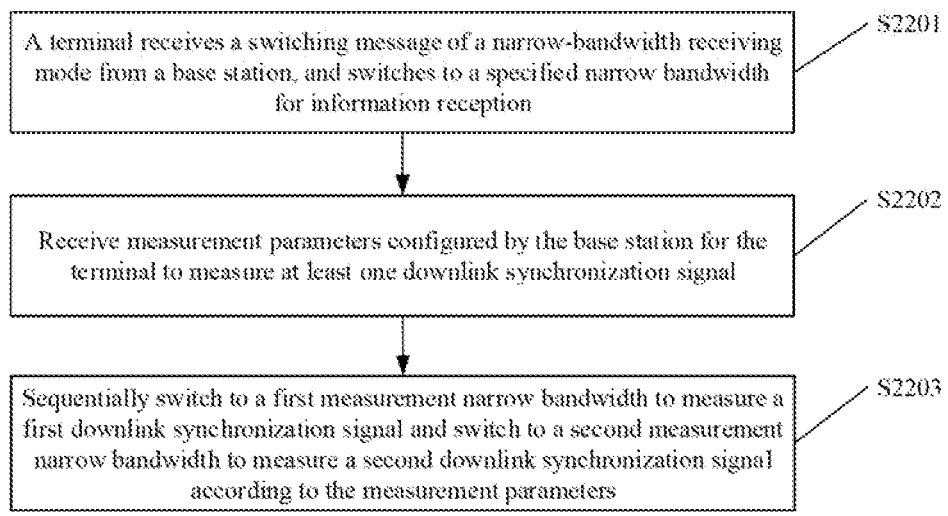
FIG. 22 illustrates a flowchart of a thirteenth embodiment of a measurement method according to the disclosure.

FIG. 22 illustrates a flowchart of a thirteenth embodiment of a measurement method according to the disclosure. In the embodiment, a first downlink synchronization signal and a second downlink synchronization signal at different frequencies are to be measured, the first downlink synchronization signal corresponds to a first measurement narrow bandwidth, and the second downlink synchronization signal corresponds to a second measurement narrow bandwidth. Then, switching to the measurement narrow bandwidths corresponding to the downlink synchronization signals for measurement is executed according to scheduling of a base station. The measurement method includes the following actions.

In S2201, a terminal receives a switching message of a narrow-bandwidth receiving mode from a base station for switching to a specified narrow bandwidth for information reception.

In S2202, measurement parameters configured by the base station for the terminal to measure at least one downlink synchronization signal are received.

The measurement parameters include a period in which the terminal measures the downlink synchronization signal, first time information used for the terminal to measure the first downlink synchronization signal on the first measurement narrow bandwidth in the period and second time information used for the terminal to measure the second downlink synchronization signal on the second measurement narrow bandwidth in the period, the measurement parameters are sent to the terminal, and the period includes a duration in which the terminal enters the narrow-bandwidth receiving mode, switches to the first measurement narrow bandwidth to measure the first downlink synchronization signal, switches to the second measurement narrow bandwidth to measure the second downlink synchronization signal, and enters the narrow-bandwidth receiving mode again.

In S2203, switching to the first measurement narrow bandwidth to measure the first downlink synchronization signal and switching to the second measurement narrow bandwidth to measure the second downlink synchronization signal are sequentially executed according to the measurement parameters.

Alternatively, before switching to the first measurement narrow bandwidth to measure the first downlink synchronization signal and switching to the second measurement narrow bandwidth to measure the second downlink synchronization signal are sequentially executed according to the measurement parameters, the method further includes the following operation.

A triggering signal sent by the base station in the PDCCH on the narrow bandwidth is received. The triggering signal is to trigger the terminal to switch to the first measurement narrow bandwidth to measure the first downlink synchronization signal and switch to the second measurement narrow bandwidth to measure the second downlink synchronization signal according to the measurement parameters.

Alternatively, the measurement parameters configured for the terminal by the base station includes at least two different configurations, and when the measurement parameters are received, configuration patterns of the measurement parameters are determined through an indication of the PDCCH on the narrow bandwidth.

If the base station needs to modify the present measurement parameters, information sent by the base station through the PDCCH on the narrow bandwidth and instructing the terminal to use another set of configured measurement parameters for measurement is received.

FIG. 22 illustrates embodiment descriptions made from the terminal side, and a specific process may be seen from embodiment descriptions, illustrated in FIG. 17-FIG. 18, made from the base station side and will not be elaborated herein.

Figure 23:
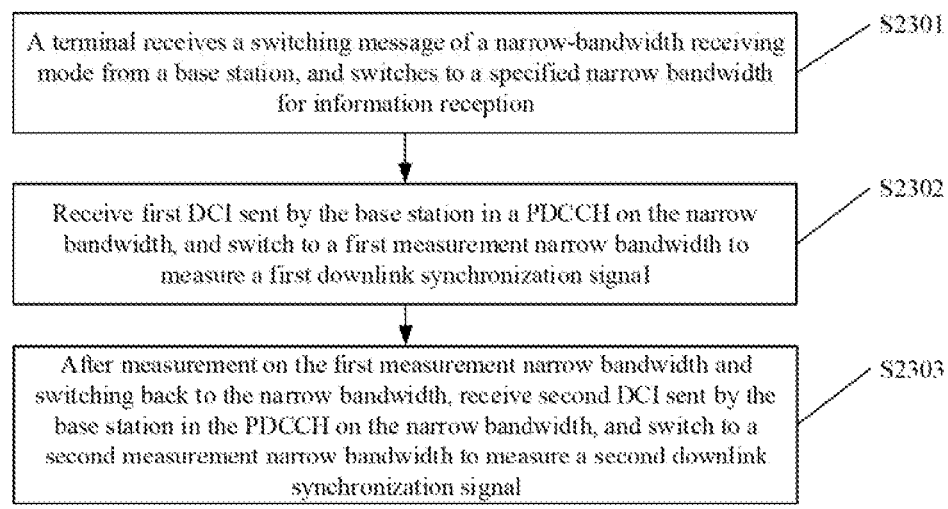
FIG. 23 is a flowchart of a fourteenth embodiment of a measurement method according to the disclosure.

FIG. 23 illustrates a flowchart of a fourteenth embodiment of a measurement method according to the disclosure. A first downlink synchronization signal and a second downlink synchronization signal at different frequencies are to be measured, the first downlink synchronization signal corresponds to a first measurement narrow bandwidth, and the second downlink synchronization signal corresponds to a second measurement narrow bandwidth. Then, switching to the measurement narrow bandwidths corresponding to the downlink synchronization signals for measurement is executed according to scheduling of a base station. In the embodiment, the measurement method includes the following actions.

In S2301, a terminal receives a switching message of a narrow-bandwidth receiving mode from a base station for switching to a specified narrow bandwidth for information reception.

In S2302, the terminal receives first DCI sent by the base station in a PDCCH on the narrow bandwidth, and switches to the first measurement narrow bandwidth to measure the first downlink synchronization signal.

The first DCI includes bandwidth information of the first measurement narrow bandwidth, and starting time and ending time for measurement on the irst measurement narrow bandwidth.

In S2303, after measurement on the first measurement narrow bandwidth and switching back to the narrow bandwidth, the terminal receives second DCI sent by the base station in the PDCCH on the narrow bandwidth, and switches to the second measurement narrow bandwidth to measure the second downlink synchronization signal.

The second DCI includes bandwidth information of the second measurement narrow bandwidth, and starting time and ending time for measurement on the second measurement narrow bandwidth.

Alternatively, the method may further include the following operation.

Measurement narrow bandwidth indexes, each configured for the bandwidth information of a respective one of the first measurement narrow bandwidth and the second measurement narrow bandwidth by the base station are received. The measurement narrow bandwidth index is to indicate the bandwidth information of the measurement narrow bandwidth, to which the terminal is to switch.

FIG. 23 illustrates embodiment descriptions made from the terminal side, and a specific process may be seen from embodiment descriptions, illustrated in FIG. 19-FIG. 20, made from the base station side and will not be elaborated herein.

Figure 24:
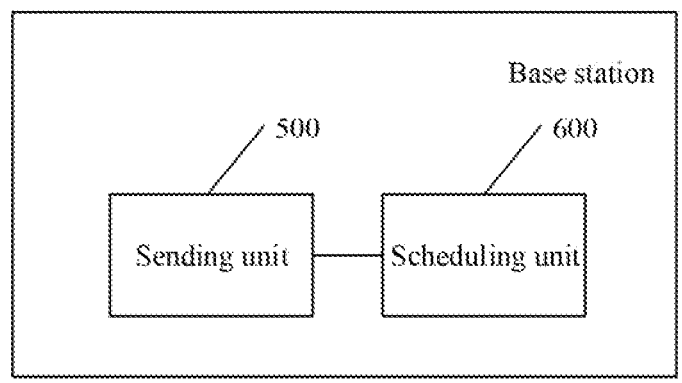
FIG. 24 is a block diagram of a third embodiment of a base station according to the disclosure.

FIG. 24 illustrates a block diagram of a third embodiment of a base station according to the disclosure. In the embodiment, the base station includes a sending unit 500 and a scheduling unit 600.

The sending unit 500 sends a switching message of a narrow-bandwidth receiving mode to a terminal, to instruct the terminal to switch to a specified narrow bandwidth for information reception.

When at least one downlink synchronization signal needs to be measured, the scheduling unit 600 schedules, by the base station, the terminal to switch to a measurement narrow bandwidth corresponding to the at least one downlink synchronization signal for measurement.

Herein, each of the narrow bandwidth and the measurement narrow bandwidth is smaller than a system bandwidth.

Alternatively, if a first downlink synchronization signal and a second downlink synchronization signal at different frequencies are to be measured, the first downlink synchronization signal corresponds to a first measurement narrow bandwidth and the second downlink synchronization signal corresponds to a second measurement narrow bandwidth, the scheduling unit 600 is arranged to configure measurement parameters for the terminal to measure the at least one downlink synchronization signal, and send the measurement parameters to the terminal. The measurement parameters include a period in which the terminal measures the at least one downlink synchronization signal, first time information used for the terminal to measure the first downlink synchronization signal on the first measurement narrow bandwidth in the period and second time information used for the terminal to measure the first downlink synchronization signal on the second measurement narrow bandwidth in the period. The period includes a duration in which the terminal enters the narrow-bandwidth receiving mode, switches to the first measurement narrow bandwidth to measure the first downlink synchronization signal, switches to the second measurement narrow bandwidth to measure the second downlink synchronization signal, and enters the narrow-bandwidth receiving mode again.

The scheduling unit 600 is further arranged to schedule the terminal to sequentially switch to the first measurement narrow bandwidth to measure the first downlink synchronization signal and switch to the second measurement narrow bandwidth to measure the second downlink synchronization signal according to the measurement parameters.

Alternatively, before the terminal is scheduled to sequentially switch to the first measurement narrow bandwidth to measure the first downlink synchronization signal and switch to the second measurement narrow bandwidth to measure the second downlink synchronization signal according to the measurement parameters, the sending unit 500 is further arranged to send a triggering signal in a PDCCH on the narrow bandwidth. The triggering signal is to trigger the terminal to sequentially switch to the first measurement narrow bandwidth to measure the first downlink synchronization signal and switch to the second measurement narrow bandwidth to measure the second downlink synchronization signal according to the measurement parameters.

Alternatively, the measurement parameters configured for the terminal by the base station includes at least two different configurations, and when the sending unit 500 sends the measurement parameters to the terminal, the scheduling unit 600 is further arranged to indicate the terminal configuration patterns of the measurement parameters through the PDCCH on the narrow bandwidth.

If the present measurement parameters need to be modified, the scheduling unit 600 is further arranged to instruct the terminal to use another set of configured measurement parameters for measurement through the PDCCH on the narrow bandwidth.

Alternatively, if the first downlink synchronization signal and second downlink synchronization signal at different frequencies are to be measured, the first downlink synchronization signal corresponds to the first measurement narrow bandwidth and the second downlink synchronization signal corresponds to the second measurement narrow bandwidth, the scheduling unit 600 is arranged to send first DCI in the PDCCH on the narrow bandwidth, and schedule the terminal to switch to the first measurement narrow bandwidth to measure the first downlink synchronization signal. The first DCI includes bandwidth information of the first measurement narrow bandwidth, and starting time and ending time for measurement on the first measurement narrow bandwidth.

After the terminal completes measurement on the first measurement narrow bandwidth and switches back to the narrow bandwidth, the scheduling unit 600 is arranged to send second DCI in the PDCCH on the narrow bandwidth, and schedule the terminal to switch to the second measurement narrow bandwidth to measure the second downlink synchronization signal. The second DCI includes bandwidth information of the second measurement narrow bandwidth, and starting time and ending time for measurement on the second measurement narrow bandwidth.

Alternatively, the scheduling unit 600 is further arranged to configure, for the bandwidth information of the first measurement narrow bandwidth and the second measurement narrow bandwidth, respective measurement narrow bandwidth indexes. The measurement narrow bandwidth index is to indicate the bandwidth information of the measurement narrow bandwidth, to which the terminal is to switch.

Figure 25:
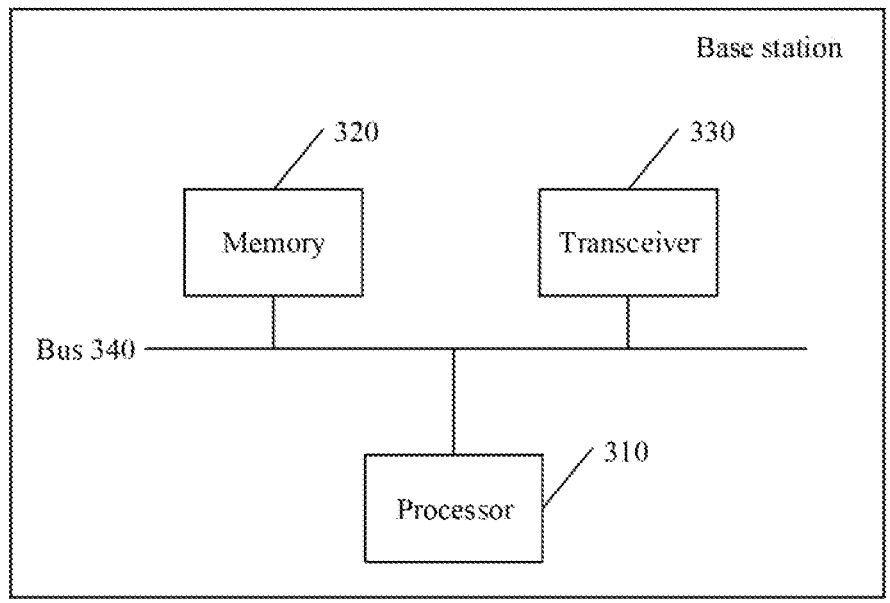
FIG. 25 is a block diagram of a fourth embodiment of a base station according to the disclosure.

FIG. 25 illustrates a block diagram of a fourth embodiment of a base station according to the disclosure. In the embodiment, the base station includes a processor 310, a memory 320, a transceiver 330 and a bus 340. The processor 310, the memory 320 and the transceiver 330 are connected through the bus 340. The transceiver 330 is arranged to send and receive signals and communicate with a terminal. The memory 320 is arranged to store a set of program codes. The processor 310 is arranged to call the program codes stored in the memory 320 to execute the following operations.

A switching message of a narrow-bandwidth receiving mode is sent, through the transceiver 330, to the terminal, to instruct the terminal to switch to a specified narrow bandwidth for information reception.

When at least one downlink synchronization signal needs to be measured, the base station schedules the terminal to switch to a measurement narrow bandwidth corresponding to the at least one downlink synchronization signal for measurement.

Herein, each of the narrow bandwidth and the measurement narrow bandwidth is smaller than a system bandwidth.

Alternatively, if the first downlink synchronization signal and second downlink synchronization signal at different frequencies are to be measured, the first downlink synchronization signal corresponds to the first measurement narrow bandwidth, and the second downlink synchronization signal corresponds to the second measurement narrow bandwidth, the processor 310 is arranged to configure measurement parameters for the terminal to measure the at least one downlink synchronization signal, the measurement parameters including a period in which the terminal measures the at least one downlink synchronization signal, first time information used for the terminal to measure the first downlink synchronization signal on the first measurement narrow bandwidth in the period and second time information used for the terminal to measure the first downlink synchronization signal on the second measurement narrow bandwidth in the period, and send the measurement parameters to the terminal, the period including a duration in which the terminal enters the narrow-bandwidth receiving mode, switches to the first measurement narrow bandwidth to measure the first downlink synchronization signal, switches to the second measurement narrow bandwidth to measure the second downlink synchronization signal, and enters the narrow-bandwidth receiving mode again.

The processor 310 is further arranged to schedule the terminal to sequentially switch to the first measurement narrow bandwidth to measure the first downlink synchronization signal and switch to the second measurement narrow bandwidth to measure the second downlink synchronization signal according to the measurement parameters.

Alternatively, before the terminal is scheduled to sequentially switch to the first measurement narrow bandwidth to measure the first downlink synchronization signal and switch to the second measurement narrow bandwidth to measure the second downlink synchronization signal according to the measurement parameters, the processor 310 is further arranged to send a triggering signal in a PDCCH on the narrow bandwidth. The triggering signal is to trigger the terminal to switch to the first measurement narrow bandwidth to measure the first downlink synchronization signal and switch to the second measurement narrow bandwidth to measure the second downlink synchronization signal according to the measurement parameters.

Alternatively, the measurement parameters configured for the terminal by the base station includes at least two different configurations, and the processor 310 is further arranged to, when the measurement parameters are sent to the terminal, indicate the terminal configuration patterns of the measurement parameters through the PDCCH on the narrow bandwidth.

If the present measurement parameters need to be modified, the processor 310 is further arranged to instruct the terminal to use another set of configured measurement parameters for measurement through the PDCCH on the narrow bandwidth.

Alternatively, if the first downlink synchronization signal and second downlink synchronization signal at different frequencies are to be measured, the first downlink synchronization signal corresponds to the first measurement narrow bandwidth, and the second downlink synchronization signal corresponds to the second measurement narrow bandwidth, the processor 310 is arranged to send first DCI in the PDCCH on the narrow bandwidth, and schedule the terminal to switch to the first measurement narrow bandwidth to measure the first downlink synchronization signal. The first DCI includes bandwidth information of the first measurement narrow bandwidth, and starting time and ending time for measurement on the first measurement narrow bandwidth.

The processor 310 is further arranged to, after the terminal completes measurement on the first measurement narrow bandwidth and switches back to the narrow bandwidth, send second DCI in the PDCCH on the narrow bandwidth, and schedule the terminal to switch to the second measurement narrow bandwidth to measure the second downlink synchronization signal. The second DCI includes bandwidth information of the second measurement narrow bandwidth, and starting time and ending time for measurement on the second measurement narrow bandwidth.

Alternatively, the processor 310 is further arranged to configure, for the bandwidth information of the first measurement narrow bandwidth and the second measurement narrow bandwidth, respective measurement narrow bandwidth indexes. The measurement narrow bandwidth index is to indicate the bandwidth information of the measurement narrow bandwidth, to which the terminal is to switch.

Figure 26:
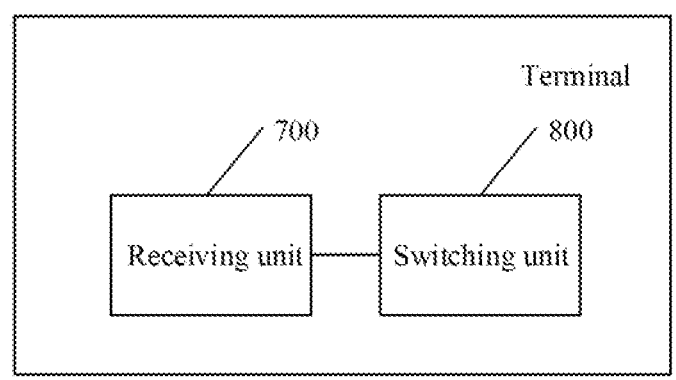
FIG. 26 is a block diagram of a third embodiment of a terminal according to the disclosure.

FIG. 26 illustrates a block diagram of a third embodiment of a terminal according to the disclosure. In the embodiment, the terminal includes a receiving unit 700 and a switching unit 800.

The receiving unit 700 is arranged to receive a switching message of a narrow-bandwidth receiving mode from a base station.

The switching unit 800 is arranged to switch to a specified narrow bandwidth for information reception according to the switching message.

The switching unit 800 is further arranged to, when at least one downlink synchronization signal needs to be measured, switch to a measurement narrow bandwidth corresponding to the at least one downlink synchronization signal for measurement according to scheduling of the base station.

Herein, each of the narrow bandwidth and the measurement narrow bandwidth is smaller than a system bandwidth.

Alternatively, if a first downlink synchronization signal and second downlink synchronization signal at different frequencies are to be measured, the first downlink synchronization signal corresponds to a first measurement narrow bandwidth and the second downlink synchronization signal corresponds to a second measurement narrow bandwidth, the receiving unit 700 is arranged to receive measurement parameters configured by the base station for the terminal to measure the at least one downlink synchronization signal. The measurement parameters includes a period in which the terminal measures the at least one downlink synchronization signal, first time information used for the terminal to measure the first downlink synchronization signal on the first measurement narrow bandwidth in the period and second time information used for the terminal to measure the first downlink synchronization signal on the second measurement narrow bandwidth in the period. The measurement parameters are sent to the terminal. The period includes a duration in which the terminal enters the narrow-bandwidth receiving mode, switches to the first measurement narrow bandwidth to measure the first downlink synchronization signal, switches to the second measurement narrow bandwidth to measure the second downlink synchronization signal, and enters the narrow-bandwidth receiving mode again.

The switching unit 800 is arranged to sequentially switch to the first measurement narrow bandwidth to measure the first downlink synchronization signal and switch to the second measurement narrow bandwidth to measure the second downlink synchronization signal according to the measurement parameters.

Alternatively, before the switching unit 800 sequentially switches to the first measurement narrow bandwidth to measure the first downlink synchronization signal and switching to the second measurement narrow bandwidth to measure the second downlink synchronization signal according to the measurement parameters, the receiving unit 700 is further arranged to receive a triggering signal sent by the base station in the PDCCH on the narrow bandwidth. The triggering signal is to trigger the terminal to switch to the first measurement narrow bandwidth to measure the first downlink synchronization signal and switch to the second measurement narrow bandwidth to measure the second downlink synchronization signal according to the measurement parameters.

Alternatively, the measurement parameters configured for the terminal by the base station includes at least two different configurations, and when the measurement parameters are received, the receiving unit 700 is further arranged to determine configuration patterns of the measurement parameters through an indication of the PDCCH on the narrow bandwidth.

If the base station needs to modify the present measurement parameters, the receiving unit 700 is further arranged to receive information sent by the base station through the PDCCH on the narrow bandwidth and instructing the terminal to use another set of configured measurement parameters for measurement.

Alternatively, if the first downlink synchronization signal and second downlink synchronization signal at different frequencies are to be measured, the first downlink synchronization signal corresponds to the first measurement narrow bandwidth and the second downlink synchronization signal corresponds to the second measurement narrow bandwidth, the receiving unit 700 is arranged to receive first DC sent by the base station in the PDCCH on the narrow bandwidth. The first DCI includes bandwidth information of the first measurement narrow bandwidth, and starting time and ending time for measurement on the first measurement narrow bandwidth.

The switching unit 800 is arranged to switch to the first measurement narrow bandwidth to measure the first downlink synchronization signal.

After completion of measurement on the first measurement narrow bandwidth and switching back to the narrow bandwidth, the receiving unit 700 is further arranged to receive second DC sent by the base station in the PDCCH on the narrow bandwidth. The second DCI includes bandwidth information of the second measurement narrow bandwidth, and starting time and ending time for measurement on the second measurement narrow bandwidth. The switching unit 800 is further arranged to switch to the second measurement narrow bandwidth to measure the second downlink synchronization signal.

Alternatively, the receiving unit 700 is further arranged to receive measurement narrow bandwidth indexes, each configured for the bandwidth information of a respective one of the first measurement narrow bandwidth and the second measurement narrow bandwidth by the base station. The measurement narrow bandwidth index is to indicate the bandwidth information of the measurement narrow bandwidth, to which the terminal is to switch.

Figure 27:
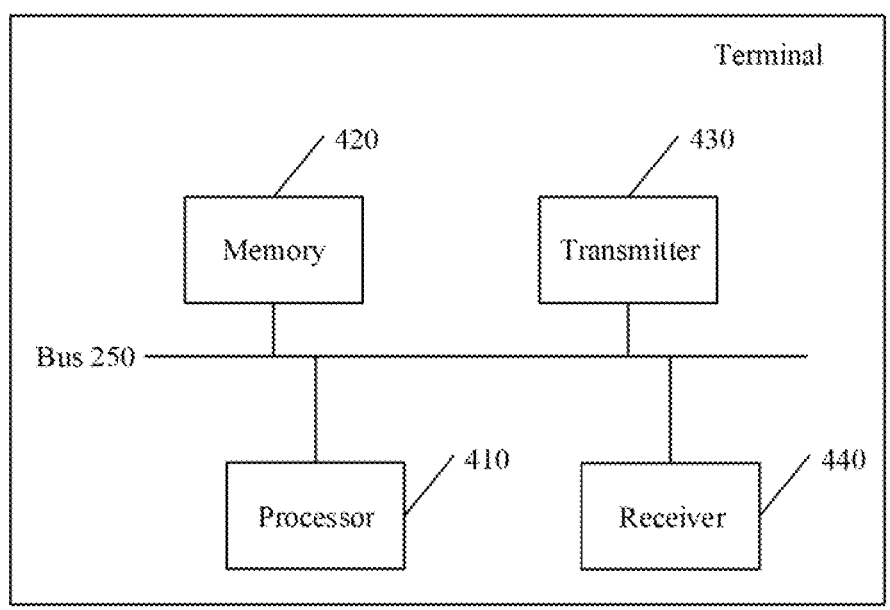
FIG. 27 is a block diagram of a fourth embodiment of a terminal according to the disclosure.

FIG. 27 illustrates a block diagram of a fourth embodiment of a terminal according to the disclosure. In the embodiment, the terminal includes a processor 410, a memory 420, a transmitter 430, a receiver 440 and a bus 450. The processor 410, the memory 420, the transmitter 430 and the receiver 440 are connected through the bus 450. The transmitter 430 is arranged to transmit a signal. The receiver 440 is arranged to receive the signal. The transmitter 430 and the receiver 440 are independently arranged respectively or integrated. The memory 420 is arranged to store a set of program codes. The processor 410 is arranged to call the program codes stored in the memory 420 to execute the following operations.

A switching message of a narrow-bandwidth receiving mode is received, through the receiver 440, from a base station.

Switching to a specified narrow bandwidth for information reception is executed according to the switching message.

When at least one downlink synchronization signal needs to be measured, switching to a measurement narrow bandwidth corresponding to the at least one downlink synchronization signal for measurement is executed according to scheduling of the base station.

Herein, each of the narrow bandwidth and the measurement narrow bandwidth is smaller than a system bandwidth.

Alternatively, if a first downlink synchronization signal and a second downlink synchronization signal at different frequencies are to be measured, the first downlink synchronization signal corresponds to a first measurement narrow bandwidth and the second downlink synchronization signal corresponds to a second measurement narrow bandwidth, the processor 410 is arranged to receive, through the receiver 440, measurement parameters configured by the base station for the terminal to measure the at least one downlink synchronization signal, the measurement parameters including a period in which the terminal measures the at least one downlink synchronization signal, first time information used for the terminal to measure the first downlink synchronization signal on the first measurement narrow bandwidth in the period, and second time information used for the terminal to measure the second downlink synchronization signal on the second measurement narrow bandwidth in the period. The measurement parameters are sent to the terminal. The period includes a duration in which the terminal enters the narrow-bandwidth receiving mode, switches to the first measurement narrow bandwidth to measure the first downlink synchronization signal, switches to the second measurement narrow bandwidth to measure the second downlink synchronization signal, and enters the narrow-bandwidth receiving mode again.

The processor 410 is further arranged to sequentially switch to the first measurement narrow bandwidth to measure the first downlink synchronization signal and switch to the second measurement narrow bandwidth to measure the second downlink synchronization signal according to the measurement parameters.

Alternatively, the processor 410 is further arranged to, before sequentially switching to the first measurement narrow bandwidth to measure the first downlink synchronization signal and switching to the second measurement narrow bandwidth to measure the second downlink synchronization signal according to the measurement parameters, receive, through the receiver 440, a triggering signal sent by the base station in a PDCCH on the narrow bandwidth. The triggering signal is to trigger the terminal to sequentially switch to the first measurement narrow bandwidth to measure the first downlink synchronization signal and switch to the second measurement narrow bandwidth to measure the second downlink synchronization signal according to the measurement parameters.

Alternatively, the measurement parameters configured for the terminal by the base station includes at least two different configurations, and when the measurement parameters is received, the processor 410 is further arranged to determine configuration patterns of the measurement parameters through an indication of the PDCCH on the narrow bandwidth.

The processor 410 is further arranged to, if the base station needs to modify the present measurement parameters, receive, through the receiver 440, information sent by the base station through the PDCCH on the narrow bandwidth and instructing the terminal to use another set of configured measurement parameters for measurement.

Alternatively, if the first downlink synchronization signal and second downlink synchronization signal at different frequencies are to be measured, the first downlink synchronization signal corresponds to the first measurement narrow bandwidth and the second downlink synchronization signal corresponds to the second measurement narrow bandwidth, the processor 410 is arranged to receive, through the receiver 440, first DCI sent by the base station in the PDCCH on the narrow bandwidth, and switch the terminal to the first measurement narrow bandwidth to measure the first downlink synchronization signal. The first DCI includes bandwidth information of the first measurement narrow bandwidth, and starting time and ending time for measurement on the first measurement narrow bandwidth.

The processor 410 is further arranged to, after completion of measurement on the first measurement narrow bandwidth and switching back to the narrow bandwidth, receive, through the receiver 440, second DCI sent by the base station in the PDCCH on the narrow bandwidth, and switch the terminal to the second measurement narrow bandwidth to measure the second downlink synchronization signal. The second DCI includes bandwidth information of the second measurement narrow bandwidth, and starting time and ending time for measurement on the second measurement narrow bandwidth.

Alternatively, the processor 410 is further arranged to receive measurement narrow bandwidth indexes, each configured for the bandwidth information of a respective one of the first measurement narrow bandwidth and the second measurement narrow bandwidth by the base station. The measurement narrow bandwidth index is to indicate the bandwidth information of the measurement narrow bandwidth, to which the terminal is to switch.

In one or more examples, the described functions may be realized through hardware, software, firmware or any combination thereof. If being implemented through the software, the functions may be stored in a computer-readable medium or sent through the computer-readable medium as one or more instructions or codes and executed through a hardware-based processing unit. The computer-readable medium may include a computer-readable storage medium (corresponding to a physical medium such as a data storage medium) or a communication medium, and the communication medium includes (for example) any medium promoting transmission of a computer program from one place to another according to a communication protocol. In such a manner, the computer-readable medium may substantially correspond to (1) a non-transitory physical computer-readable storage medium or (2) a communication medium such as a signal or a carrier. The data storage medium may be any available medium accessible for one or more computers or one or more processors to retrieve an instruction, a code and/or a data structure for implementation of a technology described in the disclosure. The computer program product may include the computer-readable medium.

Exemplarily but unlimitedly, some computer-readable storage media may include a Random Access Memory (RAM), a Read-Only Memory (ROM), an Electrically Erasable Programmable ROM (EEPROM), a Compact Disc ROM (CD-ROM) or another optical disk memory, a magnetic disk memory or another magnetic storage device, a flash memory or any other medium arranged to store a required program code in form of an instruction or a data structure and accessible for a computer. Moreover, any connection may be appropriately called a computer-readable medium. For example, if an instruction is sent from a website, a server or another remote source by use of a coaxial cable, an optical cable, a twisted pair, a Digital Subscriber Line (DSL) or a wireless technology (for example, infrared, radio and microwave), the coaxial cable, the optical cable, the twisted pair, the DSL or the wireless technology (for example, infrared, radio and microwave) are included in a definition about media. However, it is to be understood that the computer-readable storage medium and the data storage medium do not include any connection, carrier, signal or other transitory medium but are about non-transitory physical storage media. For example, a magnetic disk and optical disk used in the disclosure include a Compact Disc (CD), a laser disc, an optical disk, a Digital Video Disk (DVD), a floppy disk and a blue-ray disc. Herein, the magnetic disk usually duplicates data magnetically, and the optical disk duplicates data optically through laser. A combination of the above shall also fall within the scope of computer-readable media.

Instructions may be executed by one or more processors such as one or more Digital Signal Processors (DSP), universal microprocessors. Application Specific Integrated Circuits (ASICs), Field-Programmable Gate Arrays (FPGAs) or other equivalent integrated or discrete logical circuits. Therefore, term "processor", used in the disclosure, may refer to any abovementioned structure or any one of any other structures suitable for implementation of the technology described in the disclosure. In addition, in some aspects, the functions described in the disclosure may be provided in dedicated hardware and/or software modules configured for coding and decoding or merged into a combined codec. Moreover, the technology may be completely implemented in one or more circuits or logical elements.

The technology of the disclosure may be widely implemented by various devices or equipment, and the devices or the equipment includes a wireless handset, an Integrated Circuit (IC) or an 1C set (for example, a chip set). On the aspect of describing various components, modules or units in the disclosure to emphasize the functions of the device arranged to execute the disclosed technology, there is no requirement made for realization through different hardware units. To be precise, as described above, each unit may be combined into a codec hardware unit or is provided by combining a set of interactive operating hardware units (including one or more abovementioned processors) and proper software and/or firmware.

It is to be understood that "one embodiment" and "an embodiment" mentioned in the whole specification mean that specific features, structures or characteristics related to the embodiment is included in at least one embodiment of the disclosure. Therefore, "in one embodiment" or "in an embodiment" appearing at any place of the whole specification does not always refer to the same embodiment. In addition, these specific features, structures or characteristics may be combined in one or more embodiments in any proper manner.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

In addition, terms "system" and "network" in the disclosure may usually be exchanged in the disclosure. It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in the embodiments provided in the application. "B corresponding to A" represents that B is associated with A and B may be determined according to A. It is also to be understood that determining B according to A does not mean that B is determined only according to A and B may also be determined according to A and/or other information.

Those of ordinary skilled in the art may realize that the units and algorithm actions of each example described in combination with the embodiments disclosed in the disclosure may be implemented by electronic hardware, computer software or a combination of the two. For clearly describing exchangeability of hardware and software, the compositions and actions of each example have been generally described in the foregoing descriptions according to functions. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A measurement method, comprising:
sending, by a base station, a switching message of a narrow-bandwidth receiving mode to a terminal, wherein the switching message instructs the terminal to switch to a specified narrow bandwidth for information reception; and
scheduling, by the base station, the terminal to sequentially switch to at least two different measurement narrow bandwidths to measure downlink reference signals, when channel state information (CSI) of a downlink channel needs to be measured,
wherein each of the narrow bandwidth and the at least two different measurement narrow bandwidths is smaller than a system bandwidth,
wherein the at least two different measurement narrow bandwidths comprise a first measurement narrow bandwidth and a second measurement narrow bandwidth, and
scheduling, by the base station, the terminal to sequentially switch to the at least two different measurement narrow bandwidths to measure the downlink reference signals, when the CSI of the downlink channel needs to be measured comprises;
configuring, by the base station, measurement parameters for the terminal to measure the downlink reference signals, wherein the measurement parameters comprise a period in which the terminal measures the downlink reference signals, first time information used for the terminal to measure the downlink reference signals on the first measurement narrow bandwidth in the period, and second time information used for the terminal to measure the downlink reference signals on the second measurement narrow bandwidth in the period;
sending the measurement parameters to the terminal; wherein the period comprises a duration in which the terminal enters the narrow-bandwidth receiving mode, switches to the first measurement narrow bandwidth to measure the downlink reference signals and switches to the second measurement narrow bandwidth to measure the downlink reference signals and enters the narrow-bandwidth receiving mode again, wherein a length of the period is equal to a sum of the duration in which the terminal enters the narrow-bandwidth receiving mode, a time interval for the terminal to retune itself from the narrow bandwidth to the first measurement narrow bandwidth, the duration in which the terminal switches to the first measurement narrow bandwidth to measure the downlink reference signals, a time interval for the terminal to retune itself from the first measurement narrow bandwidth to the second measurement narrow bandwidth, the duration in which the terminal switches to the second measurement narrow bandwidth to measure the downlink reference signals, and a time interval for the terminal to retune itself from the second measurement narrow bandwidth to the narrow bandwidth; and
scheduling, according to the measurement parameters, the terminal to sequentially switch to the first measurement narrow bandwidth and the second measurement narrow bandwidth to measure the downlink reference signals.

2. The measurement method of claim 1, further comprising:
sending downlink control information(DCI) for the terminal in a physical downlink control channel (PDCCH) on the narrow bandwidth, wherein
the DCI is in a terminal-specific search space corresponding to the terminal and at a control channel element aggregation level corresponding to the terminal.

3. The measurement method of claim 1, before scheduling, according to the measurement parameters, the terminal to sequentially switch to the first measurement narrow bandwidth and the second measurement narrow bandwidth to measure the downlink reference signals, further comprising:
sending a triggering signal in the PDCCH on the narrow bandwidth, wherein the triggering signal is to trigger the terminal to switch, according to the measurement parameters, to the first measurement narrow bandwidth and the second measurement narrow bandwidth to measure the downlink reference signals.

4. The measurement method of claim 1, wherein the measurement parameters configured by the base station for the terminal comprises at least two different configurations, and when sending the measurement parameters to the terminal, the base station indicates, through the PDCCH on the narrow bandwidth, the terminal configuration patterns of the measurement parameters; and
when the present measurement parameters need to be modified, the base station instructs, through the PDCCH on the narrow bandwidth, the terminal to perform measurement using another set of configured measurement parameters.

5. The measurement method of claim 1, wherein, the at least two different measurement narrow bandwidths comprise the first measurement narrow bandwidth and the second measurement narrow bandwidth, and
scheduling, by the base station, the terminal to sequentially switch to the at least two different measurement narrow bandwidths to measure the downlink reference signals when the CSI of the downlink channel needs to be measured further comprises:

sending, by the base station, first DCI in the PDCCH on the narrow bandwidth, wherein the first DCI comprises bandwidth information of the first measurement narrow bandwidth, and starting time and ending time for measurement on the first measurement narrow bandwidth, scheduling, by the base station, the terminal to switch to the first measurement narrow bandwidth to measure the downlink reference signals; and after the terminal completes measurement on the first measurement narrow bandwidth and switches back to the narrow bandwidth, sending, by the base station, second DCI in the PDCCH on the narrow bandwidth, wherein the second DCI comprises bandwidth information of the second measurement narrow bandwidth, and starting time and ending time for measurement on the second measurement narrow bandwidth, and scheduling, by the base station, the terminal to switch to the second measurement narrow bandwidth to measure the downlink reference signals.

6. The measurement method of claim 5, wherein the base station configures, for bandwidth information of each of the at least two measurement narrow bandwidths, a corresponding measurement narrow bandwidth index, wherein the measurement narrow bandwidth index is to indicate the bandwidth information of the measurement narrow bandwidth, to which the terminal is to switch.

7. The measurement method of claim 1, further comprising:

receiving the CSI of the downlink channel reported by the terminal, wherein the CSI of the downlink channel is calculated by the terminal by using a preset algorithm based on measurement results of the at least two different measurement narrow bandwidths, or receiving the measurement results of the at least two measurement narrow bandwidths reported by the terminal and calculating the CSI of the downlink channel by using the preset algorithm; and sending a measurement stopping message to the terminal, wherein the measurement stopping message instructs the terminal to stop measuring the downlink reference signals.

8. The measurement method of claim 7, wherein the preset algorithm comprises weighted summation, averaging, or averaging without extremums.

9. A base station, comprising:

a processor, a memory, a transceiver and a bus, wherein the processor, the memory and the transceiver are connected through the bus, wherein the transceiver is arranged to send and receive signals and communicate with a terminal, the memory is arranged to store a set of program codes, and the processor is arranged to call the program codes stored in the memory to execute the following operations:

sending, through the transceiver, a switching message of a narrow-bandwidth receiving mode to the terminal, wherein the switching message instructs the terminal to switch to a specified narrow bandwidth for information reception; and scheduling the terminal to sequentially switch to at least two different measurement narrow bandwidths to measure downlink reference signals, when channel state information (CSI) of a downlink channel needs to be measured, wherein each of the narrow bandwidth and the at least two different measurement narrow bandwidths is smaller than a system bandwidth, wherein the at least two different measurement narrow bandwidths comprise a first measurement narrow bandwidth and a second measurement narrow bandwidth, and the processor is arranged to:

configure measurement parameters for the terminal to measure the downlink reference signals, wherein the measurement parameters comprise a period in which the terminal measures the downlink reference signals, first time information used for the terminal to measure the downlink reference signals on the first measurement narrow bandwidth in the period, and second time information used for the terminal to measure the downlink reference signals on the second measurement narrow bandwidth in the period, and send, through the transceiver, the measurement parameters to the terminal, wherein the period comprises a duration in which the terminal enters the narrow-bandwidth receiving mode, switches to the first measurement narrow bandwidth to measure the downlink reference signals, switches to the second measurement narrow bandwidth to measure the downlink reference signals, and enters the narrow-bandwidth receiving mode again, wherein a length of the period is equal to a sum of the duration in which the terminal enters the narrow-bandwidth receiving mode, a time interval for the terminal to retune itself from the narrow bandwidth to the first measurement narrow bandwidth, the duration in which the terminal switches to the first measurement narrow bandwidth to measure the downlink reference signals, a time interval for the terminal to retune itself from the first measurement narrow bandwidth to the second measurement narrow bandwidth, the duration in which the terminal switches to the second measurement narrow bandwidth to measure the downlink reference signals, and a time interval for the terminal to retune itself from the second measurement narrow bandwidth to the narrow bandwidth; and schedule, according to the measurement parameters, the terminal to sequentially switch to the first measurement narrow bandwidth and the second measurement narrow bandwidth to measure the downlink reference signals.

10. The base station of claim 9, wherein the processor is further arranged to, send, through the transceiver, downlink control information (DCI) for the terminal in a physical downlink control channel (PDCCH) on the narrow bandwidth; and wherein the DC is in a terminal-specific search space corresponding to the terminal and at a control channel element aggregation level corresponding to the terminal.

11. The base station of claim 9, wherein, before the terminal is scheduled to sequentially switch, according to the measurement parameters, to the first measurement narrow bandwidth and the second measurement narrow bandwidth to measure the downlink reference signals, the processor is further arranged to:

send, through the transceiver, a triggering signal in the PDCCH on the narrow bandwidth, wherein the triggering signal is to trigger the terminal to switch, according to the measurement parameters, to the first measurement narrow bandwidth and the second measurement narrow bandwidth to measure the downlink reference signals.

12. The base station of claim 9, wherein the measurement parameters configured by the base station for the terminal comprises at least two different configurations, and the processor is further arranged to, when sending the measurement parameters to the terminal, indicate the terminal configuration patterns of the measurement parameters through the PDCCH on the narrow bandwidth; and when the present measurement parameters need to be modified, the processor is further arranged to instruct, through the PDCCH on the narrow bandwidth, the terminal to perform measurement using another set of configured measurement parameters.

13. The base station of claim 9, wherein the at least two different measurement narrow bandwidths comprise the first measurement narrow bandwidth and the second measurement narrow bandwidth, and the processor is arranged to:

send first DCI in the PDCCH on the narrow bandwidth, wherein the first DCI comprises bandwidth information of the first measurement narrow bandwidth, and starting time and ending time for measurement on the first measurement narrow bandwidth;

schedule the terminal to switch to the first measurement narrow bandwidth to measure the downlink reference signals; and after the terminal completes measurement on the first measurement narrow bandwidth and switches back to the narrow bandwidth, by the base station, send second DCI in the PDCCH on the narrow bandwidth, wherein the second DCI comprises bandwidth information of the second measurement narrow bandwidth, and starting time and ending time for measurement on the second measurement narrow bandwidth, and schedule the terminal to switch to the second measurement narrow bandwidth to measure the downlink reference signals.

14. The base station of claim 13, wherein the processor is further arranged to configure, for bandwidth information of each of the at least two measurement narrow bandwidths, a corresponding measurement narrow bandwidth index, wherein the measurement narrow bandwidth index is to indicate the bandwidth information of the measurement narrow bandwidth, to which the terminal is to switch.

15. The base station of claim 9, wherein the processor is further arranged to:

perform one of the following:
receive, through the transceiver, the CSI of the downlink channel reported by the terminal, wherein the CSI of the downlink channel calculated by the terminal by using a preset algorithm based on measurement results of the at least two different measurement narrow bandwidths, and receive, through the transceiver, the measurement results of the at least two measurement narrow bandwidths reported by the terminal, and calculate the CSI of the downlink channel by using the preset algorithm; and send a measurement stopping message to the terminal to instruct the terminal to stop measuring the downlink reference signals.

16. The base station of claim 15, wherein the preset algorithm comprises weighted summation, averaging or averaging without extremums.

* * * * *